US012650949B2

(12) United States Patent
Kim

(10) Patent No.: US 12,650,949 B2
(45) Date of Patent: Jun. 9, 2026

(54) SYSTEM ON CHIP INCLUDING PERFORMANCE CONTROLLER GENERATING CONTROL INFORMATION BASED ON FUNCTIONS AND METHOD OF OPERATING THE SAME

(71) Applicant: Samsung Electronics Co., Ltd., Suwon-si (KR)

(72) Inventor: Moongyung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 128 days.

(21) Appl. No.: 18/494,152

(22) Filed: Oct. 25, 2023

(65) Prior Publication Data

US 2024/0143540 A1 May 2, 2024

(30) Foreign Application Priority Data

Oct. 27, 2022 (KR) ........................ 10-2022-0140502

(51) Int. Cl.
| | |
|---|---|
| *G06F 15/78* | (2006.01) |
| *G06F 1/08* | (2006.01) |
| *G06F 1/324* | (2019.01) |
| *G06F 1/3296* | (2019.01) |
| *G06F 9/30* | (2018.01) |
| *G06F 11/30* | (2006.01) |
| *G06F 15/82* | (2006.01) |

(52) U.S. Cl.
CPC ............ *G06F 15/7814* (2013.01); *G06F 1/08* (2013.01); *G06F 11/30* (2013.01)

(58) Field of Classification Search
CPC ...... G06F 15/7814; G06F 1/08; G06F 1/3296; G06F 1/324; G06F 15/7807; G06F 15/82; G06F 9/30007; G06F 9/30072; G06F 9/30083
See application file for complete search history.

(56) References Cited

U.S. PATENT DOCUMENTS

| | | | |
|---|---|---|---|
| 6,205,555 B1 | 3/2001 | Kageshima et al. | |
| 7,222,030 B2 | 5/2007 | Banginwar et al. | |
| 7,840,825 B2 | 11/2010 | Altevogt et al. | |
| 7,996,658 B2 * | 8/2011 | Nagao ..................... | G06F 9/485 |
| | | | 712/227 |
| 8,645,673 B2 | 2/2014 | Bell, Jr. et al. | |
| 9,268,611 B2 * | 2/2016 | Iyer ........................ | G06F 12/084 |
| 9,436,512 B2 | 9/2016 | Peng et al. | |
| 9,727,435 B2 | 8/2017 | Naffziger et al. | |

(Continued)

FOREIGN PATENT DOCUMENTS

| | | |
|---|---|---|
| JP | 2017-111642 A | 6/2017 |
| KR | 101552953 B1 | 9/2015 |

*Primary Examiner* — Shawn Doman
(74) *Attorney, Agent, or Firm* — Harness, Dickey & Pierce, P.L.C.

(57) ABSTRACT

A system on chip (SoC) includes a processor configured to execute code corresponding to at least one application and a performance controller configured to generate control information for controlling performance of the processor for each function to be executed by the processor by using a history table in which a plurality of history performance information items respectively corresponding to a plurality of functions included in the code are stored and to generate a control signal corresponding to the control information.

20 Claims, 22 Drawing Sheets

(56) References Cited

U.S. PATENT DOCUMENTS

| | | | | |
|---|---|---|---|---|
| 9,785,226 | B2 | 10/2017 | Rotem et al. | |
| 9,811,389 | B2 | 11/2017 | Rider et al. | |
| 10,203,747 | B2 | 2/2019 | Nicholson et al. | |
| 11,243,768 | B2 | 2/2022 | Rotem et al. | |
| 2003/0163743 | A1* | 8/2003 | Endo | G06F 1/32 |
| | | | | 713/300 |
| 2004/0123297 | A1* | 6/2004 | Flautner | G06F 1/3203 |
| | | | | 718/102 |
| 2005/0273310 | A1 | 12/2005 | Newburn | |
| 2010/0287396 | A1* | 11/2010 | Barth | G06F 11/3423 |
| | | | | 702/182 |
| 2011/0173463 | A1* | 7/2011 | Gargash | G06F 1/324 |
| | | | | 713/300 |
| 2013/0198371 | A1* | 8/2013 | Branson | G06F 9/5088 |
| | | | | 709/224 |
| 2013/0346766 | A1 | 12/2013 | Tani | |
| 2014/0310561 | A1* | 10/2014 | Zhang | G06F 11/3636 |
| | | | | 714/38.1 |
| 2014/0317254 | A1* | 10/2014 | Iizuka | G06F 11/3452 |
| | | | | 709/221 |
| 2016/0054774 | A1* | 2/2016 | Song | G06F 9/5094 |
| | | | | 713/320 |
| 2016/0314019 | A1* | 10/2016 | Naito | G06F 9/5066 |
| 2017/0083074 | A1* | 3/2017 | Piga | G06F 1/329 |
| 2017/0249000 | A1* | 8/2017 | Ragland | G06F 1/324 |
| 2018/0157315 | A1* | 6/2018 | Ehsan | G06F 1/3296 |
| 2019/0213010 | A1* | 7/2019 | Shin | G06F 11/348 |
| 2021/0064514 | A1* | 3/2021 | Slobodskoy | G06F 11/3466 |
| 2021/0349726 | A1* | 11/2021 | Venkataraman | G06F 9/5094 |
| 2023/0035134 | A1* | 2/2023 | Hirai | G06F 1/3234 |
| 2023/0126109 | A1* | 4/2023 | Mukherjee | G06F 1/3234 |
| | | | | 713/320 |
| 2023/0393644 | A1* | 12/2023 | Zlotnik | G06F 1/28 |
| 2024/0020216 | A1* | 1/2024 | Ableidinger | G06F 11/3466 |

* cited by examiner

| Target Address | History Performance Information |
|---|---|
| TADD_11(F_11) | H_PL11 |
| TADD_21(F_21) | H_PL_21 |
| ⋮ | ⋮ |
| TADD_p1(F_p1) | H_PL_p1 |

FIG. 6B

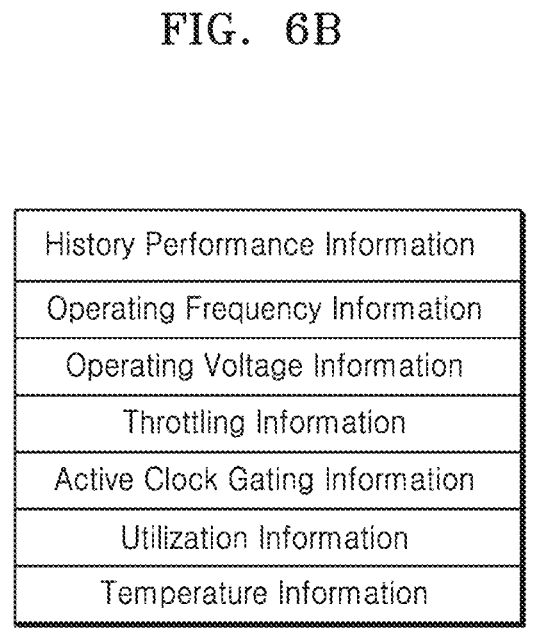

| History Performance Information |
| --- |
| Operating Frequency Information |
| Operating Voltage Information |
| Throttling Information |
| Active Clock Gating Information |
| Utilization Information |
| Temperature Information |

| Indirect Branch Target Address | History Performance Information |
|---|---|
| IB_TADD_12(F_12) | H_PI_12 |
| IB_TADD_22(F_22) | H_PI_22 |
| ⋮ | ⋮ |
| IB_TADD_q2(F_q2) | H_PI_q2 |

S122(FIG.4)

YES

DETERMINE PROCESSING TYPE OF KTH FUNCTION — S123_1

GENERATE KTH CONTROL INFORMATION BY
ADDITIONALLY CONSIDERING DETERMINED
PROCESSING TYPE OF KTH FUNCTION — S123_2

| Processing Type | Target Address | History Performance Information |
|---|---|---|
| PT_1 | TADD_11(F_11) | H_PL11 |
| PT_2 | TADD_21(F_21) | H_PL21 |
| ⋮ | ⋮ | ⋮ |
| PT_p | TADD_p1(F_p1) | H_PL_p1 |

SYSTEM ON CHIP INCLUDING PERFORMANCE CONTROLLER GENERATING CONTROL INFORMATION BASED ON FUNCTIONS AND METHOD OF OPERATING THE SAME

CROSS-REFERENCE TO RELATED APPLICATION

This application is based on and claims priority under 35 U.S.C. § 119 to Korean Patent Application No. 10-2022-0140502, filed on Oct. 27, 2022, in the Korean Intellectual Property Office, the disclosure of which is incorporated by reference herein in its entirety.

BACKGROUND

The inventive concepts relate to system on chips (SoC) including at least one processor, and more particularly, to SoCs managing performance of a processor and methods of operating the same.

In order to optimize performance (for example, a processing speed, power consumption, and heat generation) of various types of pieces of intellectual property (IP), such as a processor, the SoC uses technology of dynamically changing at least one of an operating voltage and an operating frequency applied to a processor (for example, dynamic voltage and frequency scaling (DVFS)) and throttling control technology or active clock gating control technology of controlling activation/deactivation (or on/off) of functional blocks included in the processor.

However, because the SoC measures the performance of the processor running an application based on hardware status information and controls the performance of the processor based on a measurement result, it is difficult to optimize the performance of the processor due to an inefficient operation of the processor between different software execution sections.

SUMMARY

The inventive concepts relate to system on chips (SoC) capable of optimizing performance of a processor by generating a control signal for executing a function to be executed based on history performance information corresponding to the function and providing the control signal to the processor and a method of operating the same.

According to some aspects of the inventive concepts, there is provided a system on chip (SoC) including a processor configured to execute code corresponding to at least one application and a performance controller configured to generate control information for controlling performance of the processor for each function to be executed by the processor by using a history table in which a plurality of history performance information items respectively corresponding to a plurality of functions included in the code are stored and to generate a control signal corresponding to the control information.

According to some aspects of the inventive concepts, there is provided a system on chip (SoC) including a first intellectual property (IP) configured to execute first code corresponding to at least one first application, a second IP configured to execute second code corresponding to at least one second application, and a performance controller configured to generate first control information for controlling performance of the first IP for each first function executed by the first IP by using a first history table in which a plurality of first history performance information items respectively corresponding to a plurality of first functions included in the first code are stored and to generate second control information for controlling performance of the second IP for each second function executed by the second IP by using a second history table in which a plurality of second history performance information items respectively corresponding to a plurality of second functions included in the second code are stored.

According to some aspects of the inventive concepts, there is provided a system on chip (SoC) including a first processor group including a plurality of first processors, each of the plurality of first processors configured to execute first code corresponding to at least one first application and a performance controller configured to generate a plurality of first sub-control information items of the plurality of first processors for each function to be executed by the plurality of first processors by using a history table in which a plurality of first history performance information items respectively corresponding to a plurality of first functions included in the first code are stored, to generate first group control information for collectively controlling the plurality of first processors based on the first sub-control information items, and to generate a first group control signal corresponding to the first group control information.

BRIEF DESCRIPTION OF THE DRAWINGS

Example embodiments will be more clearly understood from the following detailed description taken in conjunction with the accompanying drawings in which:

FIG. 6A is a table diagram illustrating a history table according to some example embodiments, and FIG. 6B is a table diagram illustrating subfields included in the history performance information field of FIG. 6A;

FIG. 8 is a table diagram illustrating a history table associated with some example embodiments of FIG. 7;

FIG. 10 is a table diagram illustrating a history table associated with some example embodiments of FIG. 9;

FIG. 11 is a block diagram illustrating a system on chip (SoC) according to some example embodiments;

FIG. 18 is a diagram illustrating an operation of a performance controller according to some example embodiments;

DETAILED DESCRIPTION

Figure 1:
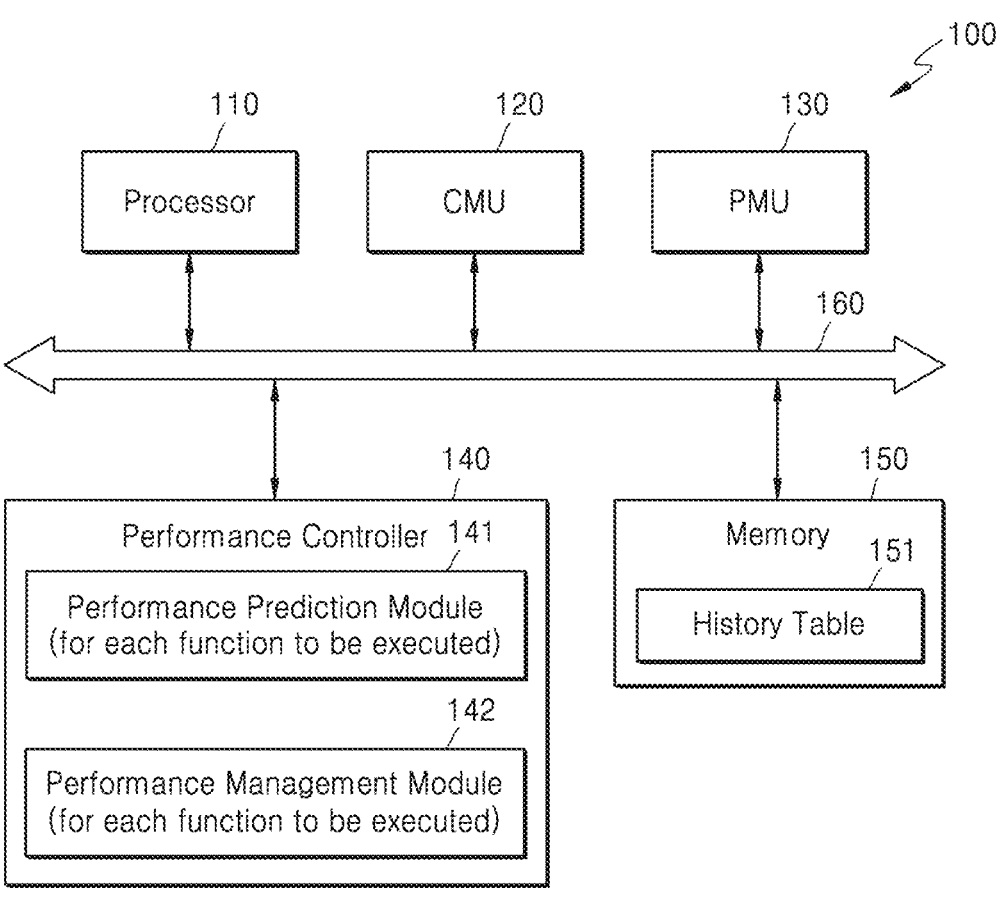
FIG. 1 is a block diagram schematically illustrating a system on chip (SoC) according to some example embodiments.

FIG. 1 is a block diagram schematically illustrating a system on chip (SoC) 100 according to some example embodiments.

The SoC 100 may be included in a personal computer (PC), a data server, or a mobile device. For example, the mobile device may include a laptop computer, a mobile phone, a smartphone, a tablet PC, a personal digital assistant (PDA), an enterprise digital assistant (EDA), a digital still camera, a digital video camera, a portable multimedia player (PMP), a personal navigation device (PND), a handheld game console, a mobile Internet device, a wearable computer, an Internet of things (IoT) device, an Internet of everything (IoE) device, a drone, and/or an e-book. However, the inventive concepts are not limited thereto.

Referring to FIG. 1, the SoC 100 may include a processor 110, a clock management unit (CMU) 120, a power management unit (PMU) 130, a performance controller 140, memory 150, and a bus 160.

The SoC 100 may execute a plurality of applications to provide services through the plurality of applications to a user. The processor 110 may drive the plurality of applications by sequentially or parallelly executing pieces of code respectively corresponding to the plurality of applications.

The CMU 120 may adjust an operating frequency of a clock signal and may provide the clock signal having the adjusted operating frequency to the processor 110.

The PMU 130 may adjust an operating voltage and may provide the adjusted operating voltage to the processor 110.

The performance controller 140 according to some example embodiments may include a performance prediction module 141 and a performance management module 142. In the present disclosure, the performance controller 140 is defined as a component for generating a control signal for the processor 110 to optimize or improve performance of the processor 110 executing code corresponding to an application. A specific operation of the performance controller 140 is described hereinafter. Meanwhile, operations of the performance prediction module 141 and the performance management module 142 to be described hereinafter may also be understood as the operation of the performance controller 140.

The processor 110 may execute code corresponding to an application to drive the application. Specifically, the code executed by the processor 110 may include a plurality of functions, and the processor 110 may sequentially execute the plurality of functions.

In some example embodiments, the performance controller 140 may control performance of the processor 110 for each function executed by the processor 110. For example, the performance controller 140 may control the performance of the processor 110 in advance so that the processor 110 is optimized or improved for execution of a first function before the processor 110 executes the first function. The operation of the performance controller 140 includes a first operation of generating control information based on history performance information indicating performance when the processor 110 previously executed a function and a second operation of generating a control signal based on the control information. The first operation may be performed by the performance prediction module 141, and the second operation may be performed by the performance management module 142.

In some example embodiments, the performance prediction module 141 may generate the control information for controlling the performance of the processor 110 for each function to be executed by the processor 110 by using a history table 151 in which a plurality of history performance information items respectively corresponding to a plurality of functions included in the code executed by the processor 110 are stored. In some example embodiments, the history table 151 may be stored in the memory 150 and accessed from the performance prediction module 141 and the performance management module 142.

In some example embodiments, the performance management module 142 may generate a control signal corresponding to the control information generated by the performance prediction module 141. For example, the control signal may include at least one of a sub-control signal provided to the processor 110, a sub-control signal provided to the CMU 120, and a sub-control signal provided to the PMU 130. Some example embodiments are described below with reference to FIG. 11.

As described above, whenever the processor 110 executes a function, the performance controller 140 generates a control signal for executing the function to control the performance of the processor 110 in units of functions.

In some example embodiments, a function to be operated by the performance controller 140 may be limited to a function having a size greater than or equal to a reference size. That is, because sizes of some functions are small (for example, less than a reference size) and an interval from a point in time at which the processor 110 starts executing the functions to a point in time at which the processor 110 completes executing the functions is short, it is difficult to sufficiently measure the performance of the processor 110 so that it may be inappropriate to generate history performance information of the functions, and it may be inefficient to control the performance of the processor 110 to execute the small functions. Therefore, when the processor 110 executes a function having a size that is greater than or equal to the reference size, the performance controller 140 may control the performance of the processor 110 based on embodiments. However, this is only some example embodiments and the inventive concepts are not limited thereto. History performance information corresponding to a function group may be generated by grouping small functions.

In some example embodiments, the function to be performed by the performance controller 140 may include a function accessed by a global function call command using an indirect branch. Specifically, the function to be executed by the performance controller 140 may be accessed through an indirect branch target address. The indirect branch target address may have an address format in which a target function is accessed by using an address stored in a register (not shown).

In some example embodiments, the performance prediction module 141 may receive code information from the processor 110 and may recognize a point in time at which the processor 110 executes a function to a point in time at which the processor 110 completes executing the function based on the code information. The performance prediction module 141 may generate history performance information or actual performance information corresponding to a function by measuring the performance of the processor 110 executing the function in an execution section from a point in time at which the processor 110 executes the function to a point in time at which the processor 110 completes executing the function. Some example embodiments are described below with reference to FIGS. 3 and 12.

In some example embodiments, the performance prediction module 141 may determine whether the history performance information corresponding to the function to be executed by the processor 110 is in the history table 151 and may generate the control information based on the determination result. Some example embodiments are described below with reference to FIG. 4.

In some example embodiments, the performance prediction module 141 may generate predicted performance information corresponding to the control information together with the control information for controlling the performance of the processor 110. In the present disclosure, the predicted performance information may be defined as information on the predicted performance of the processor 110 when the performance of the processor 110 is controlled by a control signal corresponding to the control information.

In some example embodiments, the performance management module 142 may measure the performance of the processor 110, which is controlled through a control signal matching the control information, to generate the actual performance information and may compare the actual performance information with the predicted performance information to update the history table 151 based on the comparison result. Some example embodiments are described below with reference to FIG. 12.

In some example embodiments, the processor 110, the CMU 120, the PMU 130, the performance controller 140, and the memory 150 may transmit and receive data and/or signals to and from one another through the bus 160. The bus 160 may include an advanced microcontroller bus architecture (AMBA), an advanced high-performance bus (AHB), an advanced peripheral bus (APB), an advanced extensible interface (AXI), an advanced system bus (ASB), AXI coherency extensions (ACE), or a combination thereof. However, the inventive concepts are not limited thereto.

In some example embodiments, the performance controller 140 may perform the operations of the performance prediction module 141 and the performance management module 142 by executing a command set for implementing some example embodiments of the inventive concepts. In some example embodiments, the performance prediction module 141 and the performance management module 142 may be implemented in hardware in the performance controller 140 to perform the operations described above.

In some example embodiments, the performance controller 140 may be separate from the processor 110. In some example embodiments, the performance controller 140 may be included in the processor 110.

In some example embodiments, the performance controller 140 may group functions to control the performance of the processor 110 in units of function groups. At this time, the history table 151 may store history performance information of each function group.

In addition, in some example embodiments, the performance controller 140 may be learned based on the history table 151 and may control the performance of the processor 110 according to some example embodiments based on an artificial intelligence model generated as a result of learning.

The performance controller 140 according to some example embodiments may optimize or improve the processor 110 by controlling the performance of the processor 110 by using the history table 151 for each function to be executed by the processor 110. In some example embodiments, the use of the history table 151 may allow for the performance controller 140 to quickly and effectively optimize or improve the processor 110. As a result, performance of the SoC 100 may be improved, for example, by increasing processing speed, reducing energy usage, by reducing unused resources, controlling an input voltage, and/or by improving device life by reducing resource use, reducing a temperature profile of the processor 110 during use by controlling resource usage, etc.

In addition, the performance controller 140 according to some example embodiments may maximize the effect of performance control in function units for the processor 110 by controlling the performance of the processor 110 by using the history table 151 only when the processor 110 executes functions having sizes that are greater than or equal to the reference size.

Figure 2:
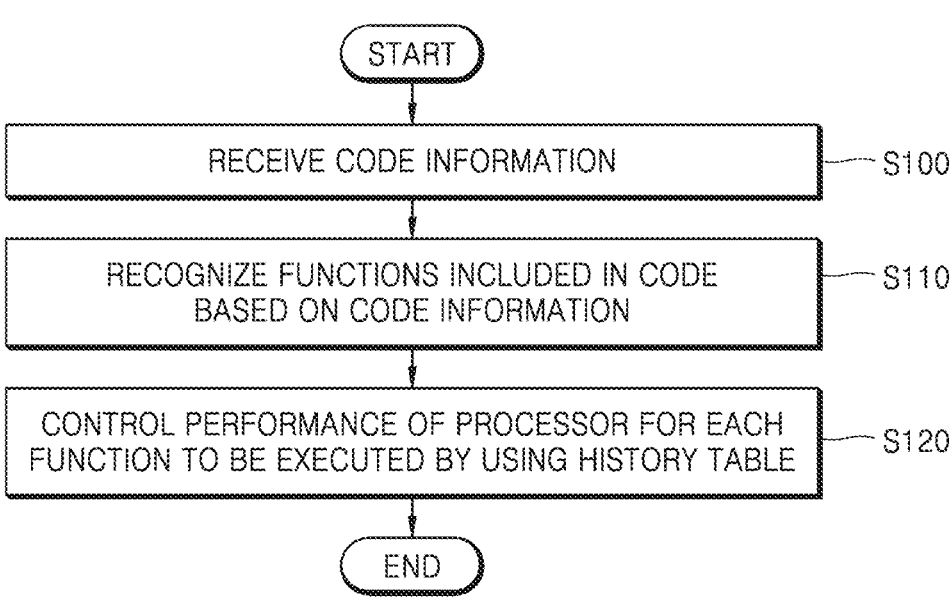
FIG. 2 is a flowchart illustrating an operation of a performance controller according to some example embodiments.

FIG. 2 is a flowchart illustrating an operation of a performance controller according to some example embodiments.

Referring to FIG. 2, in operation S100, the performance controller may receive information on code executed by a processor. In some example embodiments, the code information may include times at which function call commands of the plurality of functions included in the code are generated and times at which return commands of the plurality of functions included in the code are generated. In some example embodiments, the code information may further include target addresses of the plurality of functions. The target address may be different for each function.

In operation S110, the performance controller may recognize the plurality of functions included in the code based on the code information. In the present disclosure, recognizing the plurality of functions may include recognizing a point in time at which the processor starts executing the plurality of functions, recognizing a point in time at which the processor completes executing the plurality of functions, classifying the plurality of functions, and determining whether the plurality of functions have sizes that are greater than or equal to the reference size. In operation S110, the performance controller may sequentially recognize the plurality of functions in the order in which the plurality of functions are executed based on the code information.

In operation S120, the performance controller may control the performance of the processor for each function to be executed by using the history table. In some example embodiments, the performance controller may generate first control information based on first history performance information corresponding to the first function stored in the history table at a point in time at which the processor starts executing the first function recognized in operation S110 and may control the performance of the processor executing the first function based on a first control signal corresponding to the first control information. In some example embodiments, when the first history performance information is not in the history table, the performance controller may control the performance of the processor executing the first function in a default control method, may measure the performance of the processor at least once in a section from the point in time at which the processor starts executing the first function recognized in operation S110 to a point in time at which the processor completes executing the first function to generate the first history performance information, and may store the first history performance information in the history table.

Figure 3:
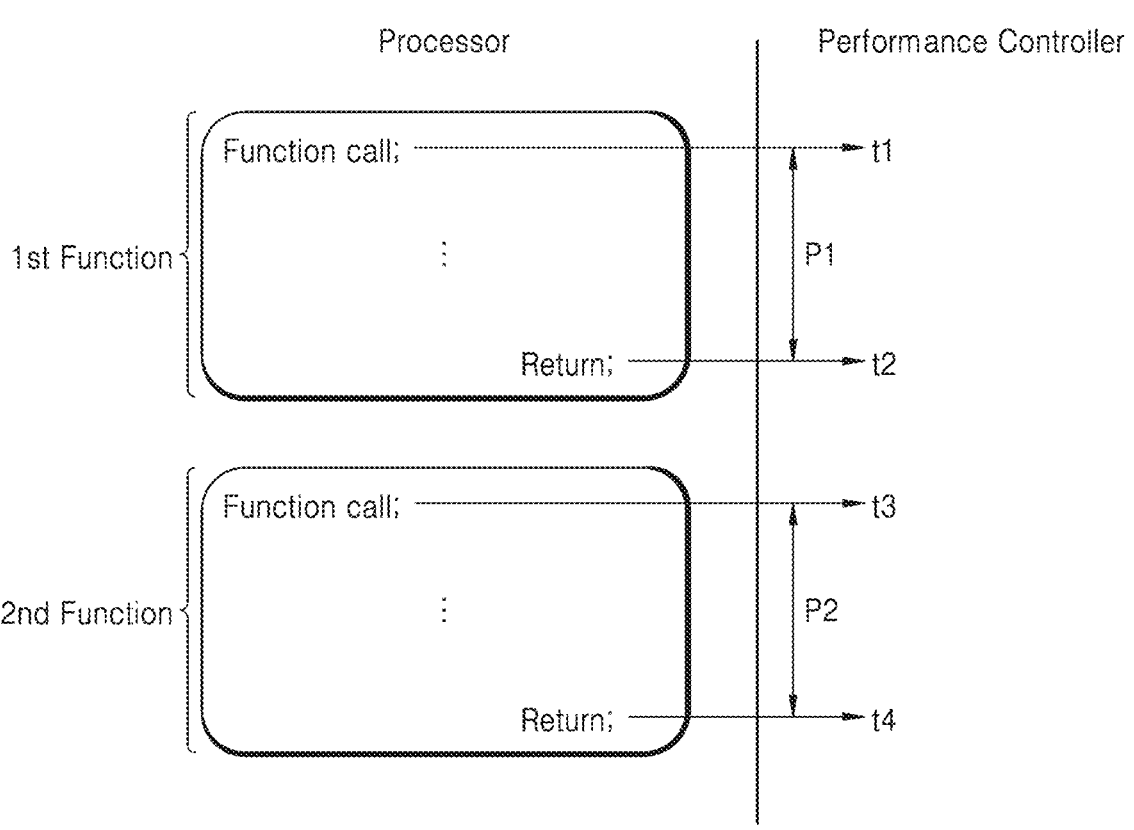
FIG. 3 is a diagram illustrating recognition operations of first and second functions of a performance controller according to some example embodiments.

FIG. 3 is a diagram illustrating a recognition operation of first and second functions of a performance controller according to some example embodiments.

Referring to FIG. 3, a processor may provide, to the performance controller, first code information including information on a point in time t1 at which a function call command for a first function is generated and a point in time t2 at which a return command for the first function is generated to the performance controller. The performance controller may recognize a section P1, in which the processor executes first function based on the first code information. In addition, the first code information further includes a target address of the first function, so that the performance controller may recognize the first function based on the target address of the first function.

The processor may provide second code information including information on a point in time t3 at which a function call command for a second function is generated and a point in time t4 at which a return command for the second function is generated to the performance controller. The performance controller may recognize a section P2 in which the processor executes second function based on the second code information. In addition, the second code information further includes a target address of the second function, so that the performance controller may recognize the second function based on the target address of the second function.

However, FIG. 3 is only some example embodiments and the inventive concepts are not limited thereto. The performance processor may control the performance of the processor in units of functions by preemptively detecting functions executed by the processor in various ways.

Figure 4:
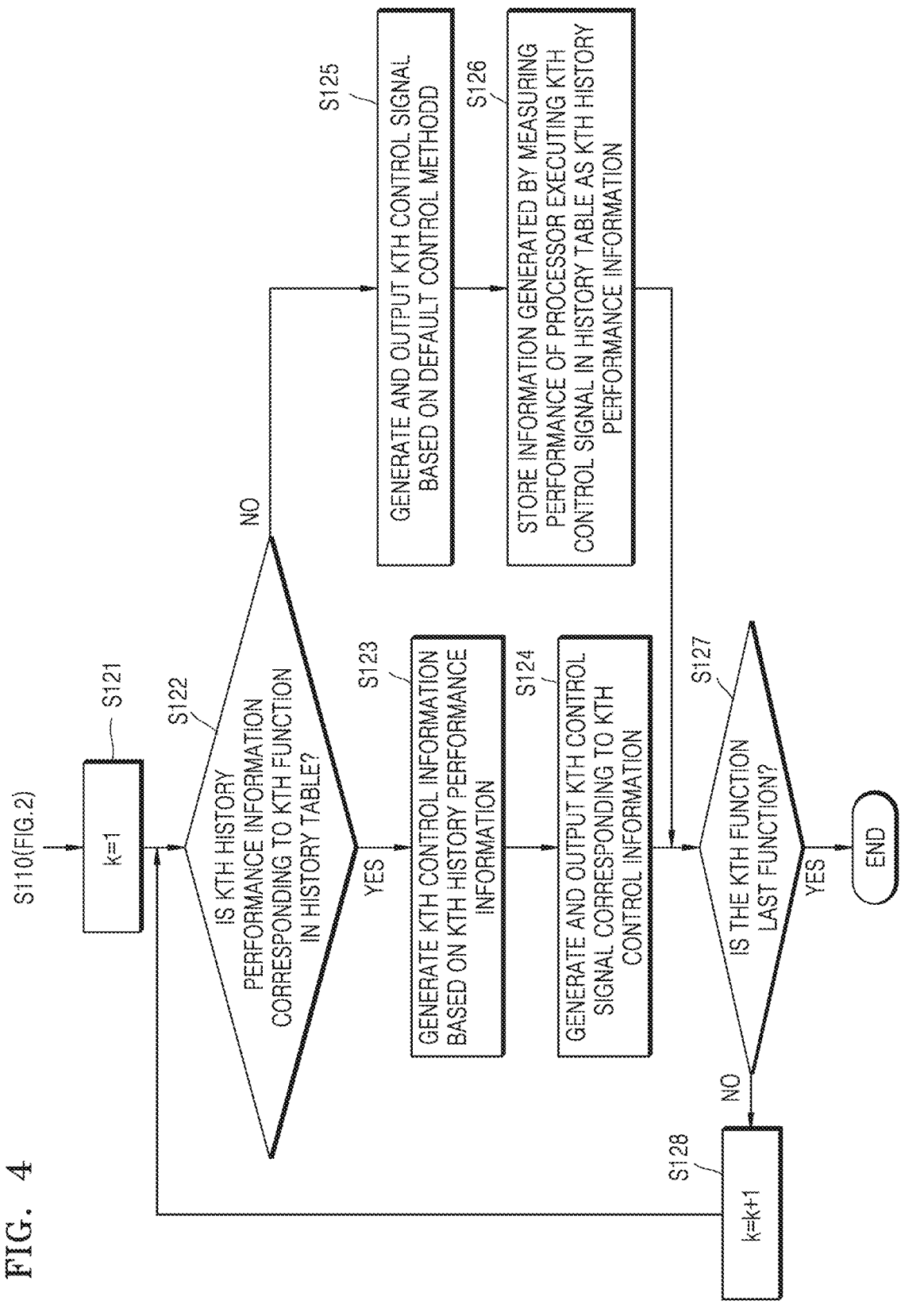
FIG. 4 is a flowchart illustrating operation S120 of FIG. 2 in detail.

FIG. 4 is a flowchart illustrating operation S120 of FIG. 2 in detail.

Referring to FIG. 4, subsequent to operation S110 of FIG. 2, after it is assumed that k is '1' in operation S121, in operation S122, the performance controller may determine whether kth history performance information corresponding to a kth function is in the history table. That is, in operation S110 of FIG. 2, functions may be input to operation S122 in the order in which the functions are recognized. For example, the first function may be a function recognized first among the functions recognized in operation S110 of FIG. 2, and the second function may mean a function recognized second after the first function. In addition, as an example, the first function and the second function may be different functions or may be the same function.

When it is determined in operation S122 of FIG. 4 that kth history performance information corresponding to a kth function is in the history table, operation S123 follows so that the performance controller may generate kth control information based on the kth history performance information. The kth control information is for controlling the performance of the processor executing the kth function. In some example embodiments, the performance controller may check the performance of the processor when the kth function was previously executed with reference to the kth history performance information, may find a factor to be improved, and may generate the kth control information for improving the factor. A specific example related to this is described below with reference to FIG. 6B.

In operation S124, the performance controller may generate and output a kth control signal corresponding to the kth control information. The kth control signal for controlling the performance of the processor executing the kth function may include at least one of a sub-control signal provided to the processor, a sub-control signal provided to the CMU, and a sub-control signal provided to the PMU.

When it is determined in operation S122 of FIG. 4 that kth history performance information corresponding to a kth function is not in the history table, operation S125 follows so that the performance controller may generate and output the kth control signal based on a default control method. The default control method may correspond to a method of generating the control information of the performance controller promised to control performance of a processor executing a function for which history performance information is not in the history table. For example, the default control method may correspond to a method of controlling the performance of the processor based on at least one of power consumption and temperature of the processor immediately before executing the current kth function.

In operation S126, the performance controller may store information generated by measuring the performance of the processor executing the kth function based on the kth control signal at least once in the history table as the kth history performance information.

In operation S127, the performance controller may determine whether the kth function is the last function executed by the processor. That is, a throttling controller may determine whether the kth function is the last recognized function among the functions recognized in operation S110 of FIG. 2. That is, the performance controller may determine whether the kth function is the last recognized function among the functions recognized in operation S110 of FIG. 2.

When it is determined in operation S127 that the kth function is not the last function executed by the processor, operation S128 follows so that the performance controller may count up k and then, operation S122 may follow. That is, in operation S128, a function recognized next to the kth function among the functions recognized in operation S110 of FIG. 2 may be input to operation S122.

When it is determined in operation S127 that the kth function is the last function executed by the processor, an operation for a current application may be terminated and an operation for a next application may be prepared.

Figure 5:
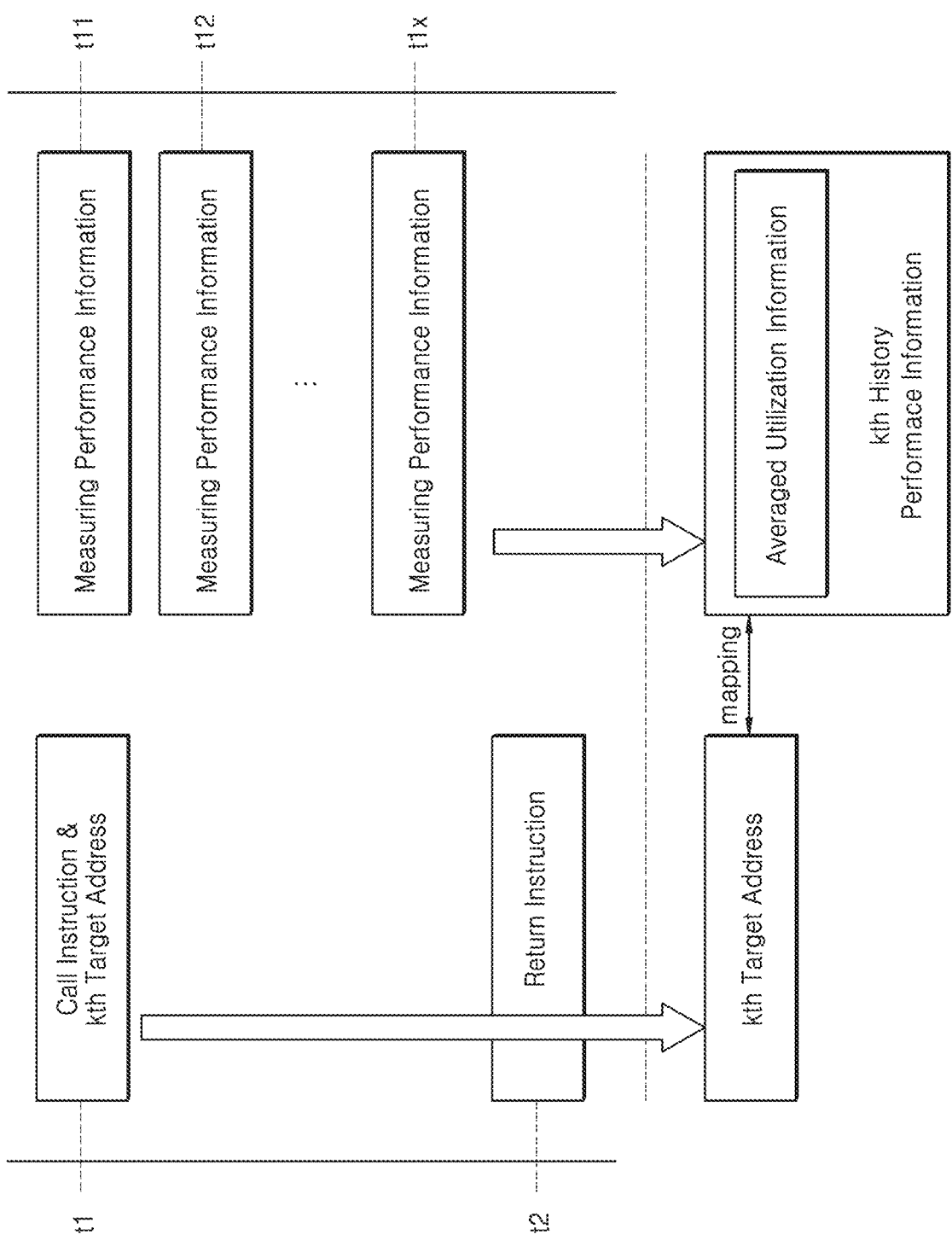
FIG. 5 is a diagram illustrating a method of generating kth history performance information, according to some example embodiments.

FIG. 5 is a diagram illustrating a method of generating kth history performance information, according to some example embodiments. In FIG. 5, the performance controller generating the kth history performance information in operation S126 of FIG. 4 is described.

Referring to FIG. 5, the performance controller may receive code information including a point in time t1 at which a function call command for the kth function is generated, a point in time t2 at which a return command for the kth function is generated, and a kth target address. The performance controller may recognize the kth function, a point in time t1 at which the processor starts executing the kth function, and a point in time t2 at which the processor completes executing the kth function.

The performance controller may measure the performance of the processor x times from a first time t11 to an xth time t1x in an execution section t1 to t2 of the kth function of the processor based on a predetermined (or, alternatively, desired or selected) measurement period. In some example embodiments, the measurement period may be set differently depending on a size of the kth function. For example, the smaller the kth function, the shorter the measurement period may be.

The performance controller may store the averaged performance information generated by averaging the performance information items measured from the first time t11 to the xth time t1x in the history table as the kth history performance information. The performance controller may map the kth history performance information to the kth target address, and the kth history performance information may be accessed through the kth target address.

The method of generating the kth history performance information in FIG. 5 is only some example embodiments, and the inventive concepts are not limited thereto. The performance controller may accumulatively store the performance information items measured from the first time t11 to the xth time t1x in the history table, or may separately store the measured performance information items in the history table.

In addition, the method of generating the kth history performance information described with reference to FIG. 5 may also be applied when kth actual performance information is generated.

FIG. 6A is a table diagram illustrating a history table TB1 according to some example embodiments, and FIG. 6B is a table diagram illustrating subfields included in the history performance information field of FIG. 6A.

Referring to FIG. 6A, the history table TB1 may include a target address field and a history performance information field. First to pth target addresses TADD_11 to TADD_p1 respectively corresponding to first to pth functions F_11 to F_p1 may be stored in the target address field, and first to pth history performance information items H_PI_11 to H_PI_p1 respectively corresponding to the first to pth functions F_11 to F_p1 may be stored in the history performance information field.

For example, when code information including the second target address TADD_21 is received from the processor, the performance controller may recognize that the processor will execute the second function F_21, and may use the second history performance information H_PI_21 to control the performance of the processor executing the second function F_21.

Referring further to FIG. 6B, the history performance information field may include an operating frequency information subfield, an operating voltage information subfield, a throttling information subfield, an active clock gating information subfield, a utilization information subfield, and a temperature information subfield.

Information on an operating frequency of a clock signal provided to the processor when the processor executes a specific function may be stored in the operating frequency information subfield.

Information on a magnitude of an operating voltage provided to the processor when the processor executes a specific function may be stored in the operating voltage information subfield.

Information on a functional block controlled to be deactivated (or turned off) among functional blocks in the processor when the processor executes a specific function may be stored in the throttling information subfield.

Information on a functional block to which a clock signal is not applied because the functional block has not been used for a certain period among the functional blocks in the processor when the processor executes a specific function may be stored in the active clock gating information subfield.

Information on a ratio of functional blocks performing processing operations among the activated functional blocks in the processor when the processor executes a specific function may be stored in the utilization information subfield.

Information on a temperature of the processor when the processor executes a specific function may be stored in the temperature information subfield.

For example, when the ratio indicated by the utilization information subfield of the second history performance information H_PI_21 referred to control the performance of the processor executing the second function F_21 is low based on a magnitude of an operating frequency or the magnitude of the operating voltage, the performance controller may generate control information to reduce the magnitude of the operating frequency or the magnitude of the operating voltage.

As another example, the performance controller may generate control information for reducing the magnitude of the operating frequency or the magnitude of the operating voltage when the temperature indicated by the temperature information subfield of the second history performance information H_PI_21 exceeds a reference temperature.

As another example, the performance controller may generate control information for increasing the number of functional blocks controlled to be deactivated (or turned off) in the processor when power consumption exceeds reference power consumption, considering the operating frequency indicated by the operating frequency information subfield of the second history performance information H_PI_21 and the operating voltage indicated by the operating voltage information subfield.

As such, the performance controller may generate the control information by considering various factors (e.g., an operating frequency, an operating voltage, throttling, active clock gating, utilization, and/or temperature) of the history performance information individually or in combination.

In some example embodiments, the control information may include information for controlling an operating frequency of a clock signal provided to a processor, an operating voltage provided to the processor, and throttling and active clock gating for the processor.

The history performance information field of FIG. 6B are some example embodiments, however the inventive concepts are not limited thereto. The history performance information field may further include subfields corresponding to various elements corresponding to the performance of the processor.

Figure 7:
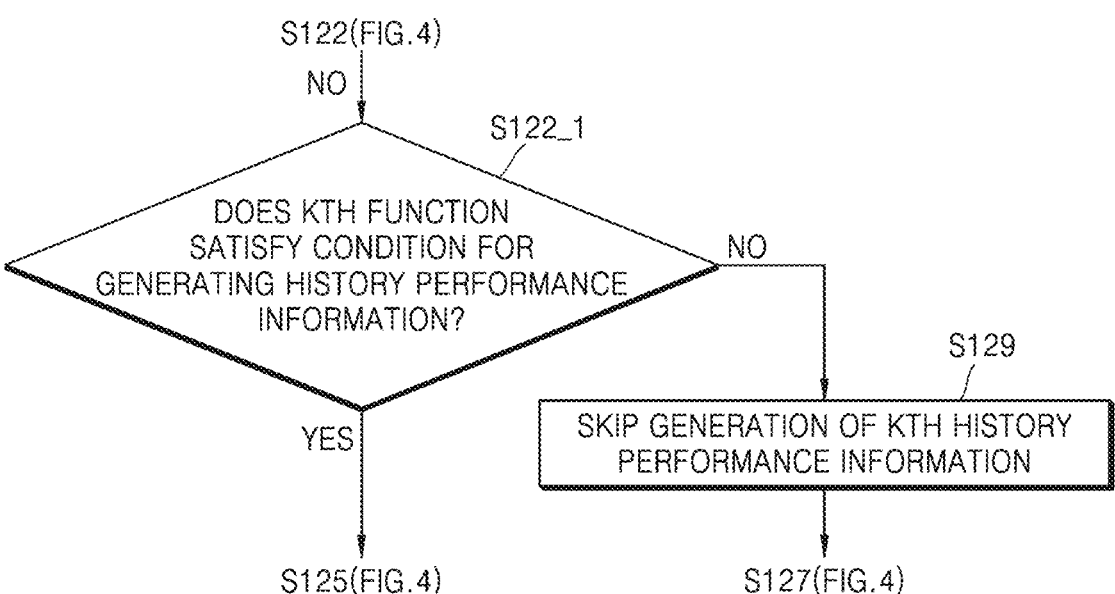
FIG. 7 is a flowchart illustrating a method of operating a performance controller for applying some example embodiments only to a function satisfying a condition.

FIG. 7 is a flowchart illustrating a method of operating a performance controller for applying some example embodiments only to a function satisfying a condition. In FIG. 7, a function satisfying a predetermined (or, alternatively, desired or selected) condition may be defined as a function having a size that is greater than or equal to the reference size, as described above.

Referring to FIG. 7, when it is determined in operation S122 of FIG. 4 that kth history performance information corresponding to a kth function is not in the history table, operation S122_1 follows so that the performance controller may determine whether the kth function satisfies a condition for generating the history performance information. In some example embodiments, the performance controller may determine whether the kth function is accessed by the global function call command using the indirect branch. Specifically, when the kth target address corresponding to the kth function corresponds to the indirect branch target address, the performance controller may determine the kth function as a function accessed by the global function call command.

When it is determined in operation S122_1 that the kth function satisfies a condition for generating the history performance information, operation S125 of FIG. 4 follows, and when it is determined in operation S122_1 that the kth function does not satisfy a condition for generating the history performance information, operation S129 follows, and the performance controller skips generation of the kth history performance information, and operation S127 of FIG. 4 may follow.

Meanwhile, in operation S129, the performance controller may generate the kth control information for controlling the performance of the processor executing the kth function in various ways. For example, the performance controller may use the previous control information generated to control the performance of the processor at the time at which a function before the kth function (for example, another function executed immediately before the kth function is executed) is executed as the kth control information. As another example, the performance controller may generate the kth control information based on a control method collectively applied to functions having a size that is less than the reference size.

FIG. 8 is a table diagram illustrating a history table TB2 associated with some example embodiments of FIG. 7.

Referring to FIG. 8, the history table TB2 may include an indirect branch target address field and a history performance information field. First to qth indirect branch target addresses IB_TADD_12 to IB_TADD_q2 corresponding to first to qth functions F_12 to F_q2 may be stored in the indirect branch target address field, and first to qth history performance information items H_PI_12 to H_PI_q2 may be stored in the history performance information field.

For example, when code information including the second indirect branch target address IB_TADD_22 is received from the processor, the performance controller may recognize that the processor will execute the second function F_22 and may use the second history performance information H_PI_22 to control the performance of the processor executing the second function F_22.

Figure 9:
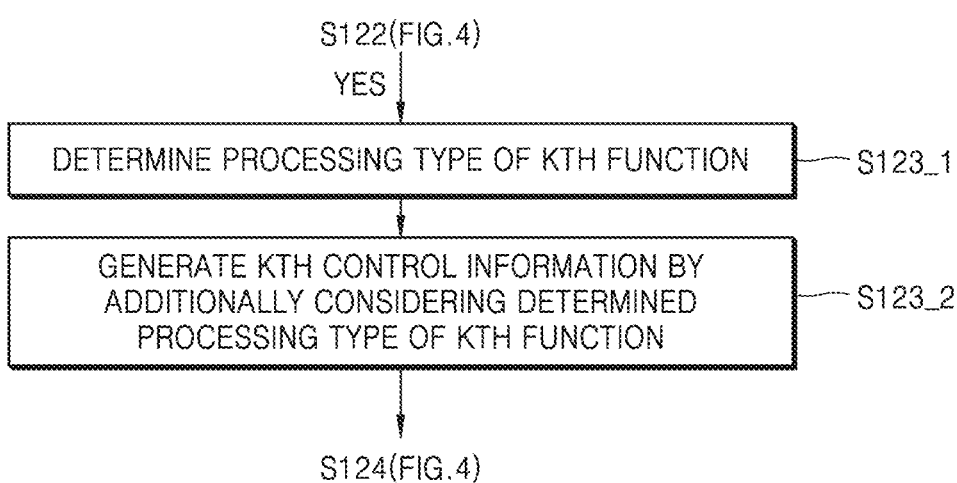
FIG. 9 is a flowchart illustrating a method of operating a performance controller, according to some example embodiments.

FIG. 9 is a flowchart illustrating a method of operating a performance controller, according to some example embodiments.

Referring to FIG. 9, when it is determined in operation S122 of FIG. 4 that kth history performance information corresponding to a kth function is in the history table, operation S123_1 follows so that the performance controller may determine a processing type of the kth function. In the present disclosure, the processing type may be an indicator indicating whether the processor intensively performs a memory operation, such as a read operation and/or a write operation, on data, or an arithmetic operation on data when the processor executes a function. In some example embodiments, a processing type of a function may also be referred to as a characteristic of a function.

In operation S123_2, the performance controller may generate the kth control information by additionally considering the processing type of the kth function determined together with the history table. For example, when it is determined by the kth function that the processor will perform the memory operation intensively, the performance controller may take this into account and may generate control information for throttling control or active clock gating control in which more functional blocks are controlled to be deactivated (or turned off) among the functional blocks performing the arithmetic operation in the processor. For example, when it is determined by the kth function that the processor will perform the memory operation intensively, the performance controller may take this into account and generate control information to increase the magnitude of the operating frequency of the clock signal provided to the processor or the magnitude of the operating voltage provided to the processor.

However, this is only some example embodiments, and the inventive concepts are not limited thereto. The performance controller may generate control information based on various methods of optimally controlling the performance of the processor in units of functions.

FIG. 10 is a table diagram illustrating a history table TB3 associated with some example embodiments of FIG. 9.

Referring to FIG. 10, the history table TB3 may include a processing type field, a target address field, and a history performance information field. First to pth target addresses TADD_11 to TADD_p1 respectively corresponding to first to pth functions F_11 to F_p1 may be stored in the target address field, and first to pth history performance information items H_PI_11 to H_PI_p1 corresponding to the first to pth functions F_11 to F_p1 may be stored in the history performance information field. In addition, first to pth processing type information items PT_1 to PT_p corresponding to the first to pth functions F_11 to F_p1 may be stored in the processing type field.

For example, when code information including the second target address TADD_21 is received from the processor, the performance controller may recognize that the processor will execute the second function F_21, and may use the second history performance information H_PI_21 and the second processing type information PT_2 to control the performance of the processor executing the second function F_21.

Figure 11:
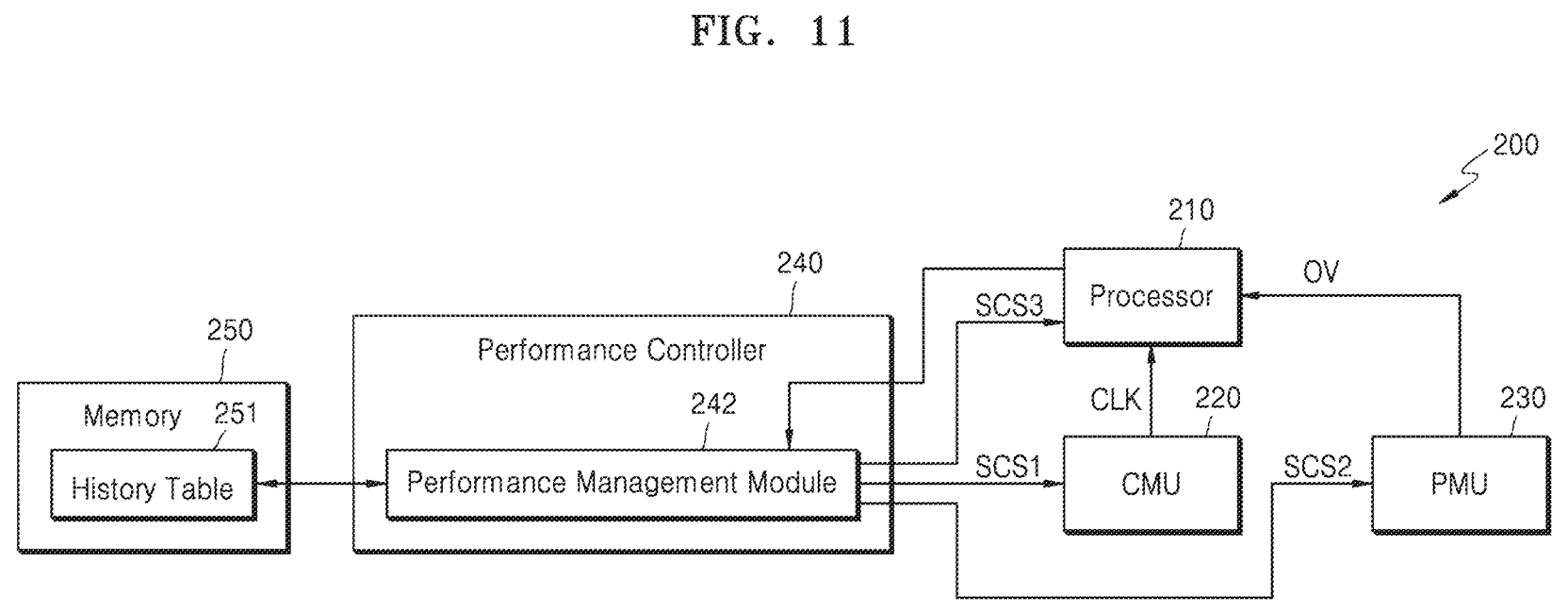

FIG. 11 is a block diagram illustrating an SoC 200 according to some example embodiments.

Referring to FIG. 11, the SoC 200 may include a processor 210, a CMU 220, a PMU 230, a performance controller 240, and memory 250.

The performance controller 240 may include a performance management module 242. In some example embodiments, the performance management module 242 may generate the kth control signal corresponding to the kth control information for controlling the performance of the processor 210 executing the kth function. The control signal may include a first sub-control signal SCS1 provided to the CMU 220, a second sub-control signal SCS2 provided to the PMU 230, and a third sub-control signal SCS3 provided to the processor 210.

In some example embodiments, the CMU 220 may adjust the operating frequency based on the first sub-control signal SCS1 and may provide a clock signal CLK having the adjusted operating frequency to the processor 210.

In some example embodiments, the PMU 230 may adjust the operating voltage based on the second sub-control signal SCS2 and may provide the adjusted operating voltage OV to the processor 210.

In some example embodiments, the processor 210 may perform throttling control and/or active clock gating control on functional blocks in the processor 210 based on the third sub-control signal SCS3.

In some example embodiments, the performance management module 242 may generate the kth actual performance information by measuring actual performance of the processor 210 according to the first to third sub-control signals SCS1 to SCS3. The performance management module 242 may compare kth predicted performance information corresponding to the kth control information with the kth actual performance information, and update the history table 251 based on the comparison result. Specifically, when a difference between the kth predicted performance information and the kth actual performance information exceeds a reference difference (for example, an absolute different, a relative (percentage) difference, etc.), the performance management module 242 may update the existing kth history performance information of the history table 251 to the kth actual performance information. In some example embodiments, when a difference between the kth predicted performance information and the kth actual performance information exceeds a reference difference, the performance management module 242 may update the existing kth history performance information of the history table 251 to an average of the existing kth history performance information of the history table 251 and the kth actual performance information. In addition, in some example embodiments, when a difference between the kth predicted performance information and the kth actual performance information exceeds a reference difference, the performance management module 242 may weigh the kth actual performance information and may update the existing kth history performance information of the history table 251 to an average of the existing kth history performance information of the history table 251 and the weighted kth actual performance information.

Figure 12:
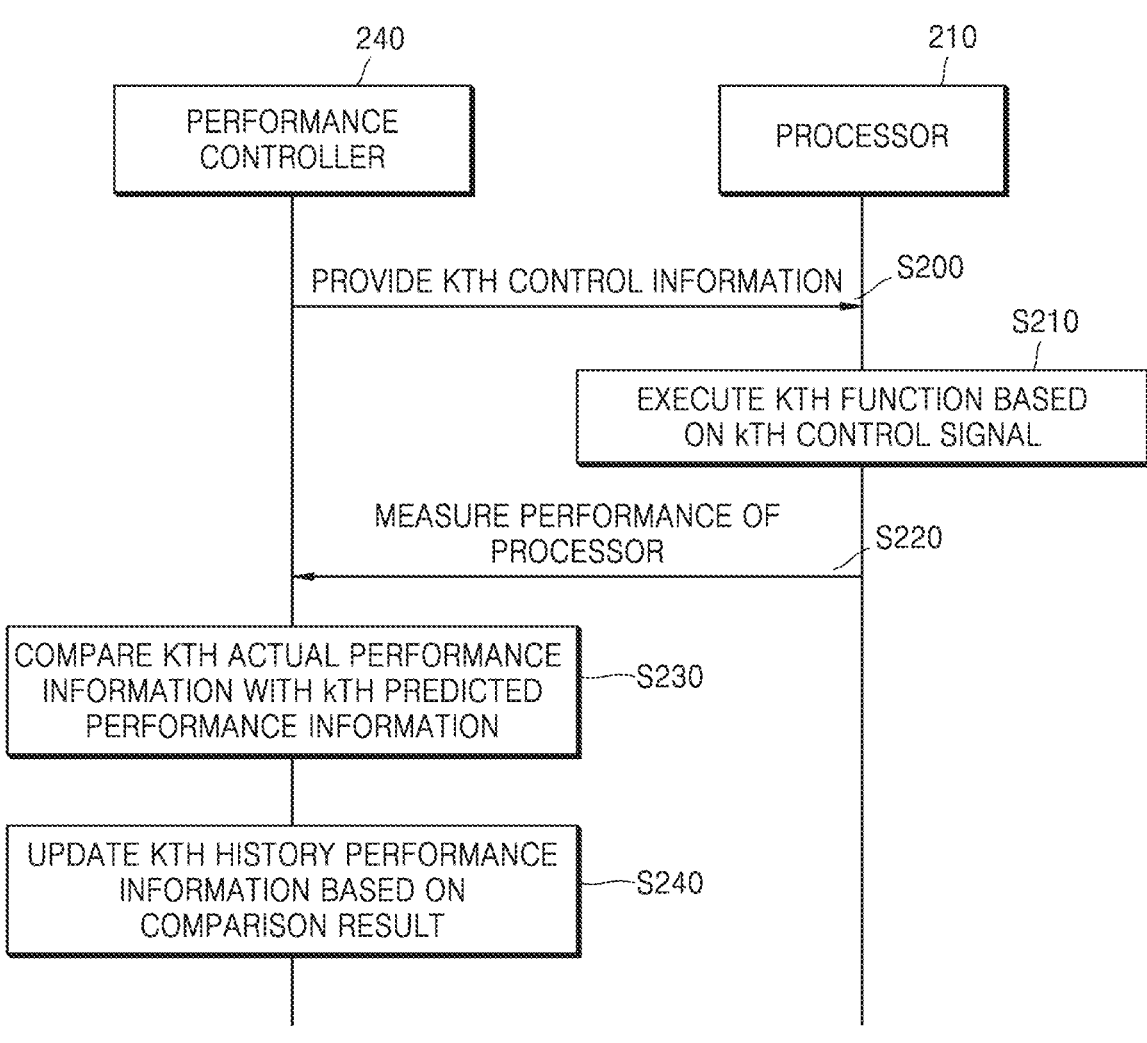
FIG. 12 is a flowchart illustrating a method of operating a processor and a performance controller, according to some example embodiments.

FIG. 12 is a flowchart illustrating a method of operating the processor 210 and the performance controller 240 according to some example embodiments.

Referring to FIG. 12, in operation S200, the performance controller 240 may provide the kth control signal to the processor 210. In operation S210, the processor 210 may execute the kth function based on the kth control signal. In operation S220, the performance controller 240 may measure the performance of the processor 210 a plurality of times in a section in which the processor 210 executes the kth function. The performance controller 240 may generate the kth actual performance information from the performance information measured the plurality of times. For example, some example embodiments described with reference to FIG. 5 may be applied to the method of generating the kth actual performance information of the performance controller 240. In operation S230, the performance controller 240 may compare the kth actual performance information with the kth predicted performance information. In operation S240, the performance controller 240 may update the kth history performance information based on the comparison result of operation S230.

Figure 13:
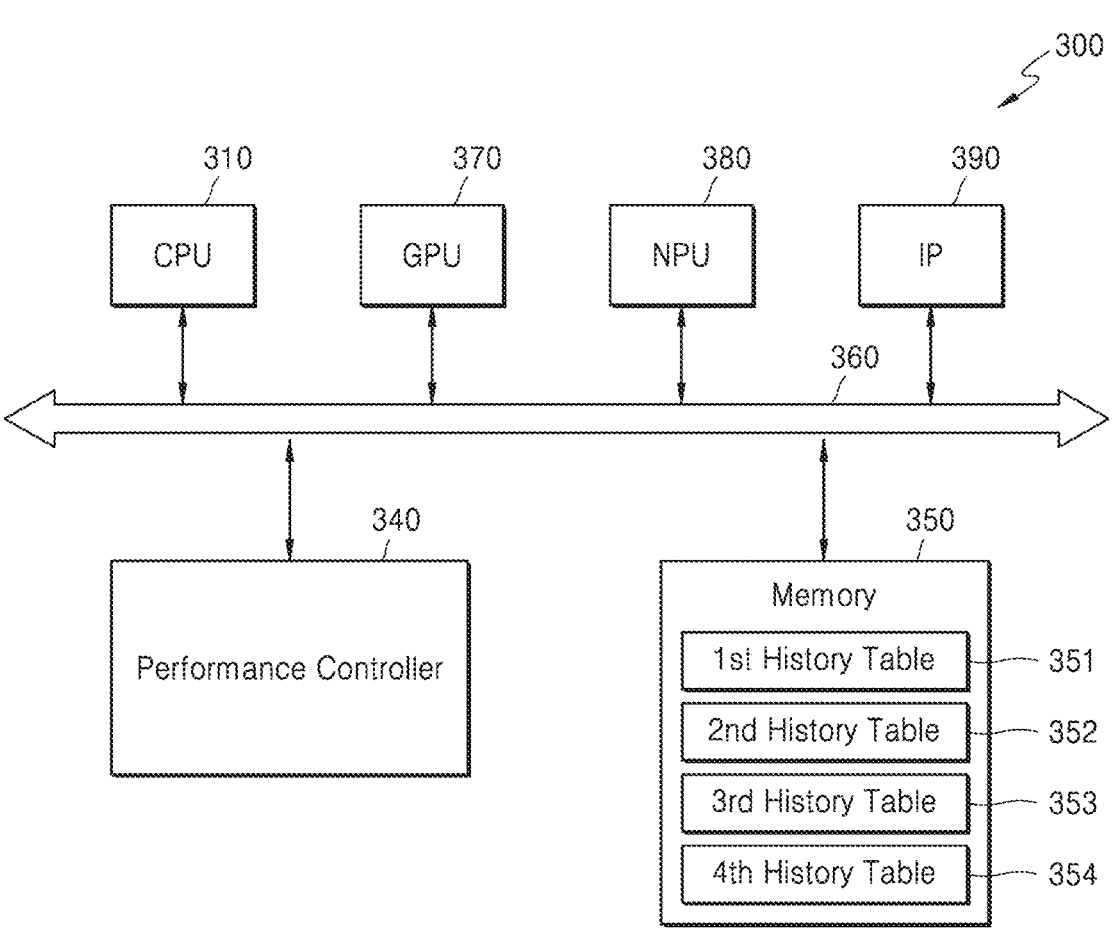
FIG. 13 is a block diagram illustrating an SoC according to some example embodiments.

FIG. 13 is a block diagram illustrating an SoC 300 according to some example embodiments.

Referring to FIG. 13, the SoC 300 may include a central processing unit (CPU) 310, a graphics processing unit (GPU) 370, a neural processing unit (NPU) 380, an arbitrary intellectual property (IP) 390, a performance controller 340, and memory 350. Each of the CPU 310, the GPU 370, and the NPU 380 may be referred to as IP.

In some example embodiments, the memory 350 may include first to fourth history tables 351 to 354. The first history table 351 may be used to control performance of the CPU 310 in units of functions, the second history table 352 may be used to control performance of the GPU 370 in units of functions, the third history table 353 may be used to control performance of the NPU 380 in units of functions, and the fourth history table 354 may be used to control performance of the arbitrary IP 390 in units of functions.

In some example embodiments, the CPU 310 may execute first code corresponding to at least one first application, and the first code may include a plurality of first functions. The first history table 351 may store a plurality of first history performance information items respectively corresponding to the plurality of first functions.

In some example embodiments, the GPU 370 may execute second code corresponding to at least one second application, and the second code may include a plurality of second functions. The second history table 352 may store a plurality of second history performance information items respectively corresponding to the plurality of second functions.

In some example embodiments, the NPU 380 may execute third code corresponding to at least one third application, and the third code may include a plurality of third functions. The third history table 353 may store a plurality of third history performance information items respectively corresponding to the plurality of third functions.

In some example embodiments, the arbitrary IP 390 may execute fourth code corresponding to at least one fourth application, and the fourth code may include a plurality of fourth functions. The fourth history table 354 may store a plurality of fourth history performance information items respectively corresponding to the plurality of fourth functions.

In some example embodiments, the performance controller 340 may control the performance of the CPU 310 for each function executed by the CPU 310 by using the first history table 351, may control the performance of the GPU 370 for each function executed by the GPU 370 by using the second history table 352, may control the performance of the NPU 380 for each function executed by the NPU 380 by using the third history table 353, and may control the performance of the arbitrary IP 390 for each function executed by the arbitrary IP 390 by using the fourth history table 354.

Characteristics of the CPU 310, the GPU 370, the NPU 380, and the arbitrary IP 390 may be different. In the present disclosure, the characteristics may be defined as processing types and maximum performance of functions mainly executed by the IP.

In some example embodiments, the performance controller 340 may generate the first to fourth history tables 351 to 354 based on the characteristics of the CPU 310, the GPU 370, the NPU 380, and the arbitrary IP 390.

In some example embodiments, the performance controller 340 may generate a control signal for controlling the performance of the CPU 310, the GPU 370, the NPU 380, and the arbitrary IP 390 based on the characteristics of the CPU 310, the GPU 370, the NPU 380, and the arbitrary IP 390.

Figure 14:
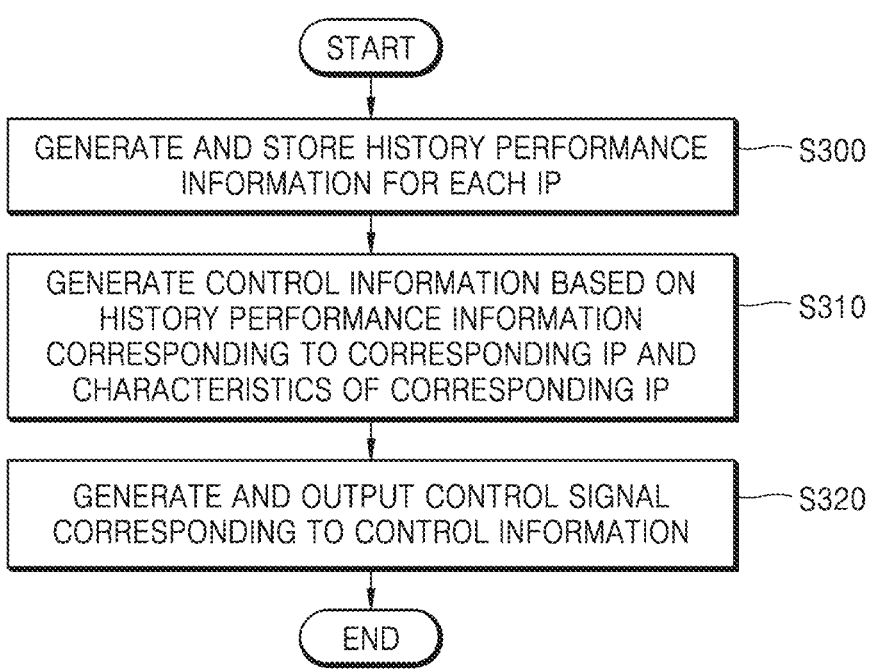
FIG. 14 is a flowchart illustrating a method of operating a performance controller associated with some example embodiments of FIG. 13.

FIG. 14 is a flowchart illustrating a method of operating a performance controller associated with some example embodiments of FIG. 13.

Referring to FIG. 14, in operation S300, the performance controller may generate history performance information of each IP and may store the history performance information of each IP in a history table for each IP. In operation S310, the performance controller may generate control information for controlling the performance of the processor in units of functions based on history performance information corresponding to a corresponding IP and characteristics of the corresponding IP. In operation S320, the performance controller may generate and output a control signal corresponding to the control information.

Figure 15:
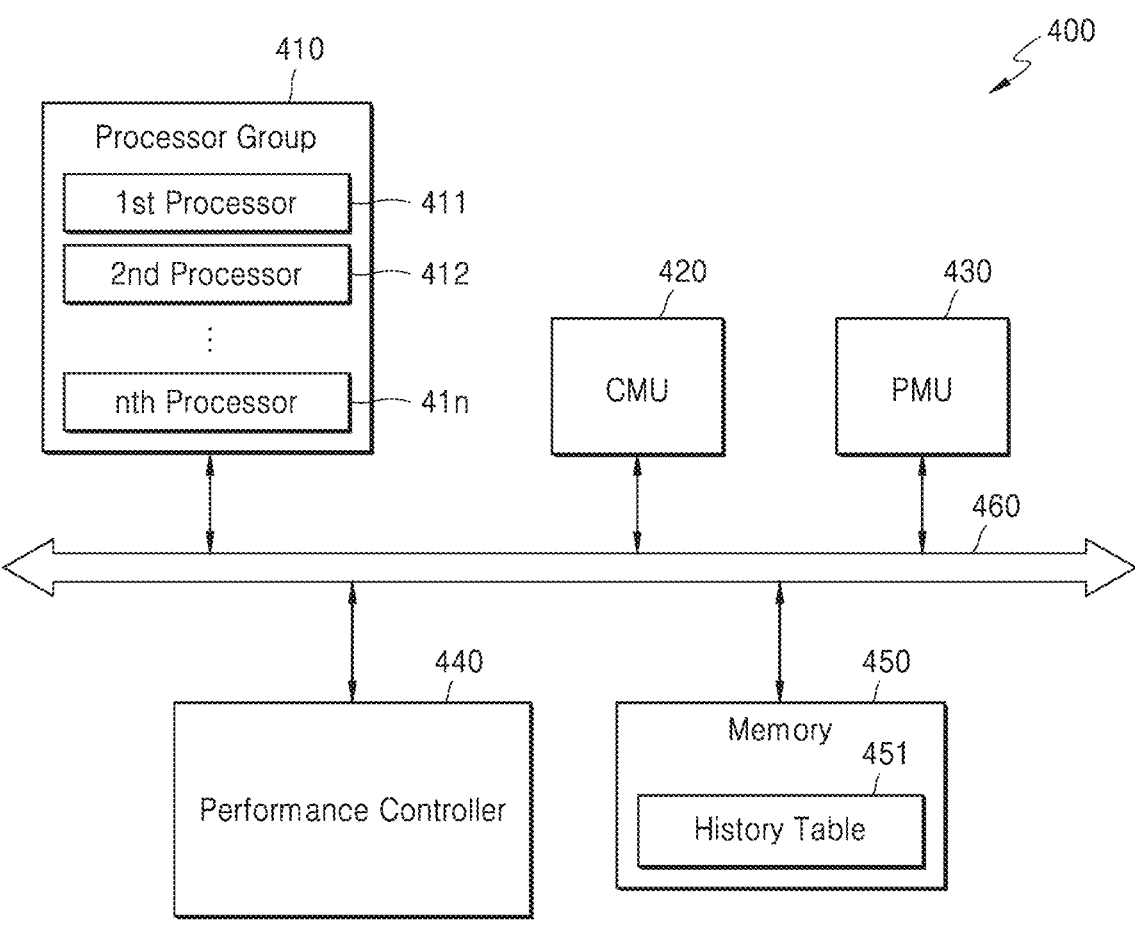
FIG. 15 is a block diagram illustrating an SoC according to some example embodiments.

FIG. 15 is a block diagram illustrating an SoC 400 according to some example embodiments. In FIG. 15, description previously given with reference to FIG. 1 will not be given.

Referring to FIG. 15, the SoC 400 may include a processor group 410, a CMU 420, a PMU 430, a performance controller 440, memory 450, and a bus 460. In the present disclosure, the processor group 410 may be referred to as a multi-processor.

In some example embodiments, the processor group 410 may include first to nth processors 411 to 41*n*. Clock signals of the same operating voltage or the same operating frequency may be provided to the first to nth processors 411 to 41*n* grouped into the processor group 410. In some example embodiments, the first to nth processors 411 to 41*n* may share a voltage source (for example, the PMU 430) or a clock source (for example, the CMU 420).

In some example embodiments, each of the first to nth processors 411 to 41*n* may execute code corresponding to at least one application. The code may include a plurality of functions.

In some example embodiments, the memory 450 may store a history table 451. The history table 451 may store a plurality of history performance information items respectively corresponding to the plurality of functions included in the code executed by each of the first to nth processors 411 to 41*n*. For example, first history performance information corresponding to a first function may include a plurality of first sub-history performance information items respectively corresponding to the first to nth processors 411 to 41*n*. Specifically, the plurality of first sub-history performance information items may include information items on the performance of the first to nth processors 411 to 41*n* when the first to nth processors 411 to 41*n* previously executed the first function.

In some example embodiments, the performance controller 440 may generate a plurality of sub-control information items of the first to nth processors 411 to 41*n* for each function to be executed by the first to nth processors 411 to 41*n* by using the history table 451 stored in the memory 450 and may generate group control information for collectively controlling the performance of the first to nth processors 411 to 41*n* based on the plurality of sub-control information items. The performance controller 440 may generate and output a group control signal corresponding to group control information. The performance of the first to nth processors 411 to 41*n* may be collectively controlled by the same group control signal.

In some example embodiments, the performance controller 440 may generate group control information from the plurality of sub-control information items in consideration of the maximum performance of the processor group 410. For example, the performance controller 440 may generate the group control information based on the plurality of sub-control information items without exceeding the maximum performance of the processor group 410. In some example embodiments, the performance controller 440 may generate the group control information by selecting one of the plurality of sub-control information items without exceeding the maximum performance of the processor group 410.

The performance controller 440 according to some example embodiments may optimize or improve the processor group 410 by collectively controlling the performance of the first to nth processors 411 to 41*n* of the processor group 410 by using the history table 451 for each function to be executed by the first to nth processors 411 to

41*n* of the processor group 410. In some example embodiments, the use of the history table 451 may allow the performance controller 440 to simply, rapidly, and effectively optimize or improve the processor group 410. As a result, the performance of the SoC 400 may be improved.

Figure 16:
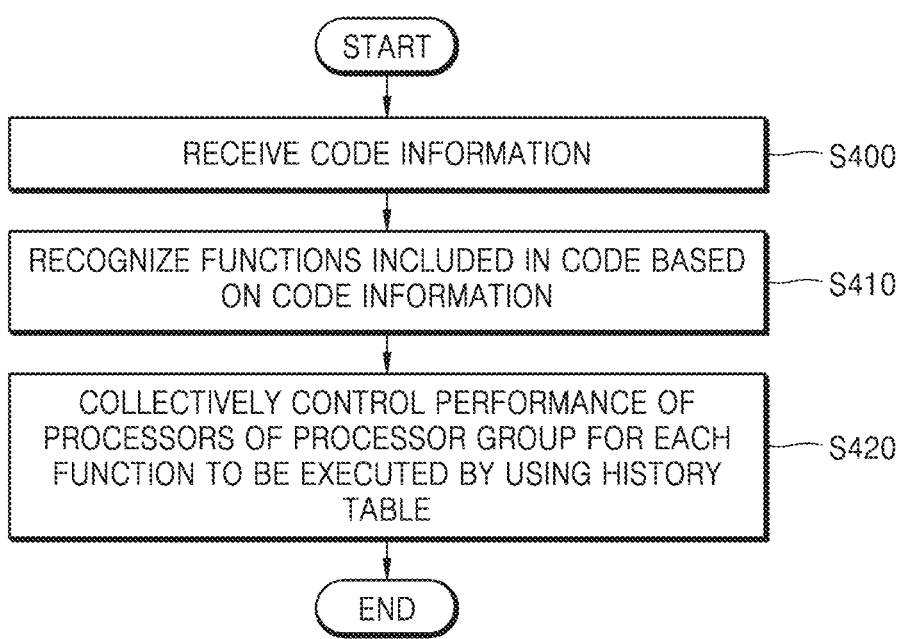
FIG. 16 is a flowchart illustrating an operation of a performance controller according to some example embodiments.

FIG. 16 is a flowchart illustrating an operation of a performance controller according to some example embodiments.

Referring to FIG. 16, in operation S400, the performance controller may receive information on code executed by processors of a processor group. In some example embodiments, the code information may include times at which function call commands of the plurality of functions included in the code are generated and times at which return commands of the plurality of functions included in the code are generated. In some example embodiments, the code information may further include target addresses of the plurality of functions. The target address may be different for each function. In some example embodiments, the performance controller may receive the code information from one selected from the processors of the processor group.

In operation S410, the performance controller may recognize the plurality of functions included in the code based on the code information. In operation S410, the performance controller may sequentially recognize the plurality of functions in the order in which the plurality of functions are executed based on the code information.

In operation S420, the performance controller may collectively control the performance of the processors of the processor group for each function to be executed by using the history table. In some example embodiments, the performance controller may generate first sub-control information items of each of the processors based on the first history performance information corresponding to the first function stored in the history table at a point in time at which the processor starts executing the first function recognized in operation S410 and may generate first group control information from the first sub-control information items based on the maximum performance of the processor group. The performance controller may collectively control the performance of the processors executing the first function based on a first group control signal corresponding to first group control information. In some example embodiments, when the first history performance information is not in the history table, the performance controller may control the performance of the processors of the processor group executing the first function in a default control method, may measure the performance of the processors in a section from the point in time at which the processor starts executing the first function recognized in operation S410 to a point in time at which the processor completes executing the first function to generate the first history performance information, and may store the first history performance information in the history table.

Figure 17:
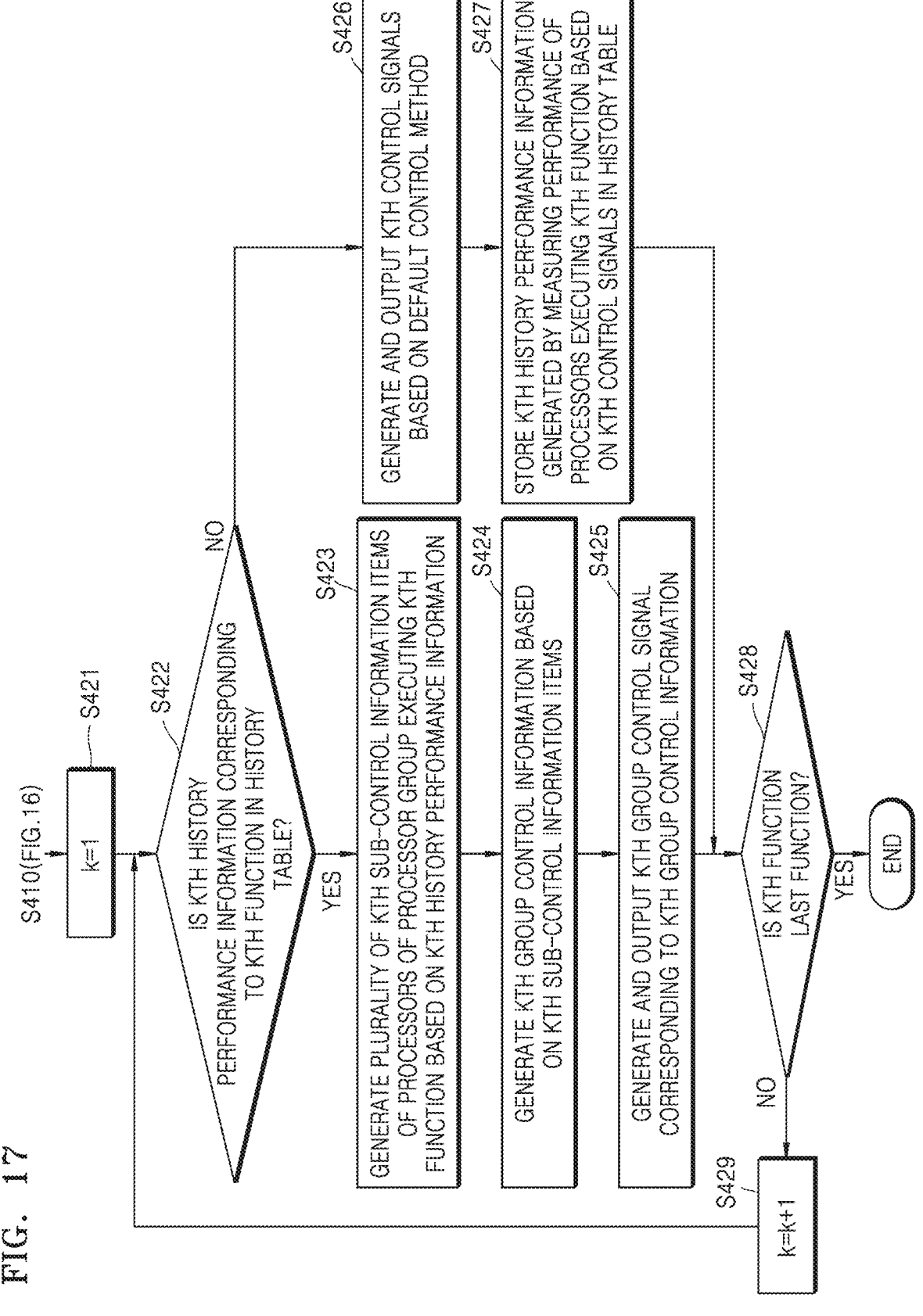
FIG. 17 is a flowchart illustrating operation S420 of FIG. 16 in detail.

FIG. 17 is a flowchart illustrating operation S420 of FIG. 16 in detail.

Referring to FIG. 17, subsequent to operation S410 of FIG. 16, after it is assumed that k is '1' in operation S421, in operation S422, the performance controller may determine whether kth history performance information corresponding to a kth function is in the history table. That is, in operation S410 of FIG. 16, functions may be input to operation S422 in the order in which the functions are recognized. For example, the first function may be a function recognized first among the functions recognized in operation S410 of FIG. 16, and the second function may mean a function recognized second after the first function. In addition, as an example, the first function and the second function may be different functions or may be the same function.

When it is determined in operation S422 that kth history performance information corresponding to a kth function is in the history table, operation S423 follows so that the performance controller may generate a plurality of kth sub-control information items based on kth history performance information. The plurality of kth sub-control information items are for controlling the performance of the processor executing the kth function. In some example embodiments, the performance controller may check the performance of the processor when the kth function was previously executed with reference to the kth sub-history performance information, may find a factor to be improved, and may generate the plurality of kth sub-control information items for improving the factor.

In operation S424, the performance controller may generate kth group control information based on the plurality of kth sub-control information items. The kth sub-control information items may include sub-control information items provided to the processors included in one processor group and executing the kth function. The kth group control information is for collectively controlling the performance of the processors included in one processor group and executing the kth function.

In operation S425, the performance controller may generate and output a kth group control signal corresponding to the kth group control information. The kth group control signal for collectively controlling the performance of the processors executing the kth function may include at least one of a sub-control signal provided to the processors, a sub-control signal provided to the CMU, and a sub-control signal provided to the PMU.

When it is determined in operation S422 that kth history performance information corresponding to a kth function is not in the history table, operation S426 follows so that the performance controller may generate and output kth control signals to be provided to the processors based on a default control method. The default control method may correspond to a method of generating the control information of the performance controller promised to control performance of processors executing a function for which history performance information is not in the history table. For example, the default control method may correspond to a method of controlling the performance of the processors based on at least one of power consumption and temperature of the processors immediately before executing the current kth function.

In operation S427, the performance controller may store information items generated by measuring the performance of the processors executing the kth function based on the kth control signals in the history table as the kth history performance information.

In operation S428, the performance controller may determine whether the kth function is the last function executed by the processors. That is, the performance controller may determine whether the kth function is the last recognized function among the functions recognized in operation S410 of FIG. 16.

When it is determined in operation S428 that the kth function is not the last function executed by the processors, operation S429 follows so that the performance controller may follow operation S422 after counting up k. That is, among the functions recognized in operation S410 of FIG. 16 through operation S429, a function recognized next to the kth function may be input to operation S422.

Figure 18:
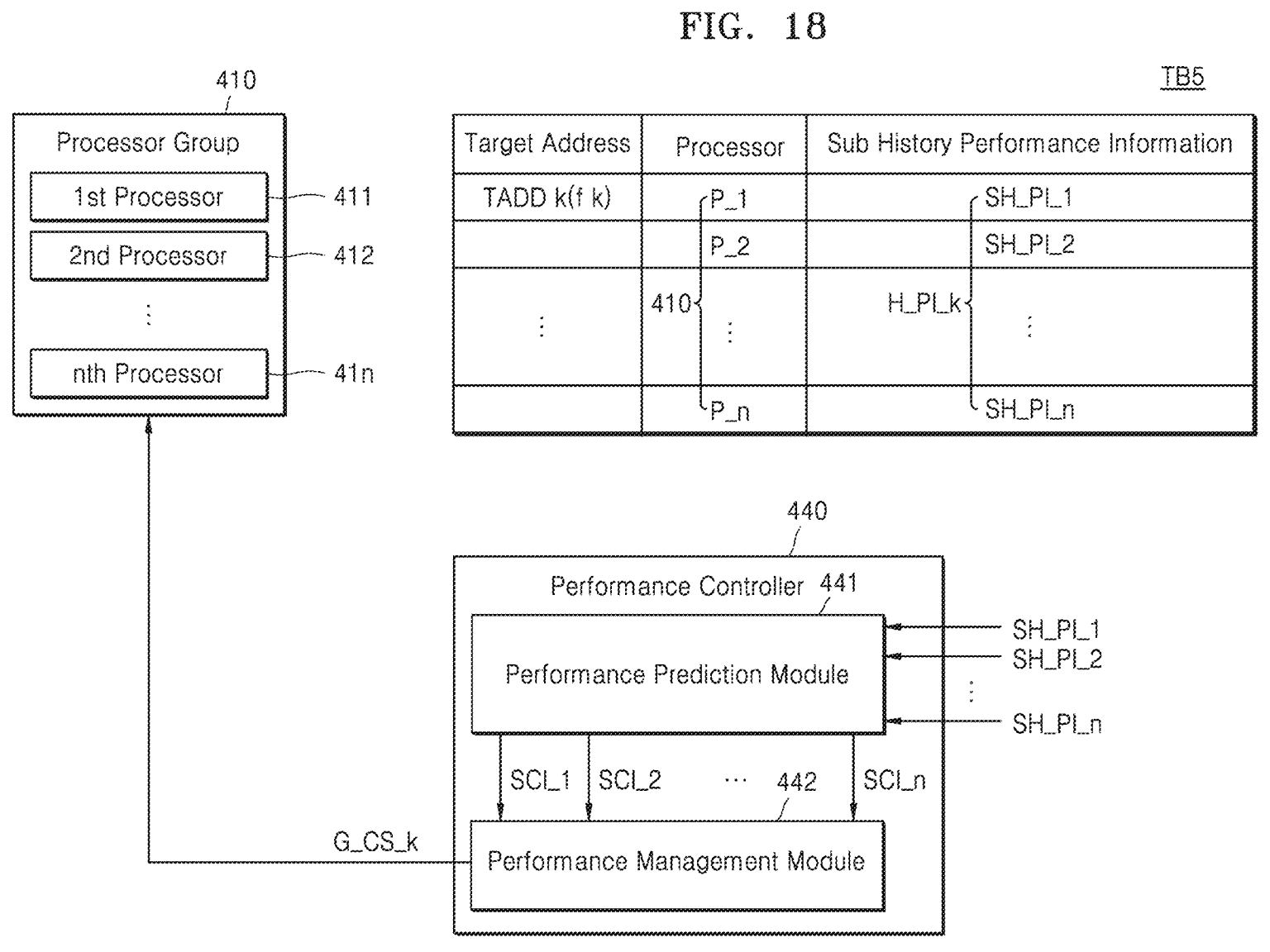

FIG. 18 is a diagram illustrating an operation of the performance controller 440 according to some example embodiments.

Referring to FIG. 18, the processor group 410 may include first to nth processors 411 to 41n. The performance controller 440 may include a performance prediction module 441 and a performance management module 442.

In some example embodiments, the performance controller 440 may control the performance of the first to nth processors 411 to 41n of the processor group 410 by using a history table TB5.

In some example embodiments, the history table TB5 may include a target address field, a processor field, and a sub-history performance information field. The kth target address TADD_k corresponding to the kth function f_k may be stored in the target address field, indicators P_1 to P_n indicating the first to nth processors 411 to 41n of the processor group 410 may be stored in the processor field, and first to nth sub-history performance information items SH_PI_1 to SH_PI_n respectively corresponding to the first to nth processors 411 to 41n when the kth function f_k was previously executed by the first to nth processors 411 to 41n may be stored in the sub-history performance information field. In some example embodiments, the history table TB5 may further include a maximum performance field including maximum performance information of the processor group.

In some example embodiments, the performance prediction module 441 may generate first to nth sub-control information items SCI_1 to SCI_n based on the first to nth sub-history performance information items SH_PI_1 to SH_PI_n. In some example embodiments, the performance prediction module 441 may include a plurality of circuits (not shown) operating in parallel to generate the first to nth sub-control information items SCI_I to SCI_n in parallel (for example, at or about the same time).

In some example embodiments, the performance management module 442 may generate the kth group control information from the first to nth sub-control information items SCI_1 to SCI_n, may generate the kth group control signal G_CS_k corresponding to the kth group control information, and may output the kth group control signal G_CS_k to the processor group 410.

In some example embodiments, the performance management module 442 may generate the kth group control information from the first to nth sub-control information items SCI_1 to SCI_n based on the maximum performance of the processor group 410. In the present disclosure, the maximum performance of the processor group 410 may be defined as the maximum power consumption and the maximum temperature of the processor group. For example, the performance management module 442 may select sub-control information of a processor expected to have the highest performance when the performance of the first to nth processors 411 to 41n is controlled by using the first to nth sub-control information items SCI_1 to SCI_n. Before generating the kth group control signal G_CS_k from the selected sub-control information, the performance management module 442 may generate the kth group control signal G_CS_k based on the expected result by predicting whether the performance of the processor group 410 will exceed the maximum performance due to the selected sub-control information. For example, when it is expected that the performance of the processor group 410 will exceed the maximum performance, the performance management module 442 may select other sub-control information to generate the kth group control signal G_CS_k.

In some example embodiments, the performance management module 442 may generate the kth group control information by combining the first to nth sub-control information items SCI_1 to SCI_n based on the maximum performance of the processor group 410. For example, the performance management module 442 may generate the kth group control information by averaging the first to nth sub-control information items SCI_1 to SCI_n. However, this is only some example embodiments and the inventive concepts are not limited thereto. The performance management module 442 may generate the kth group control information in various ways.

In some example embodiments, the performance of the first to nth processors 411 to 41n executing the kth function f_k may be collectively controlled by the kth group control signal G_CS_k.

Figure 19:
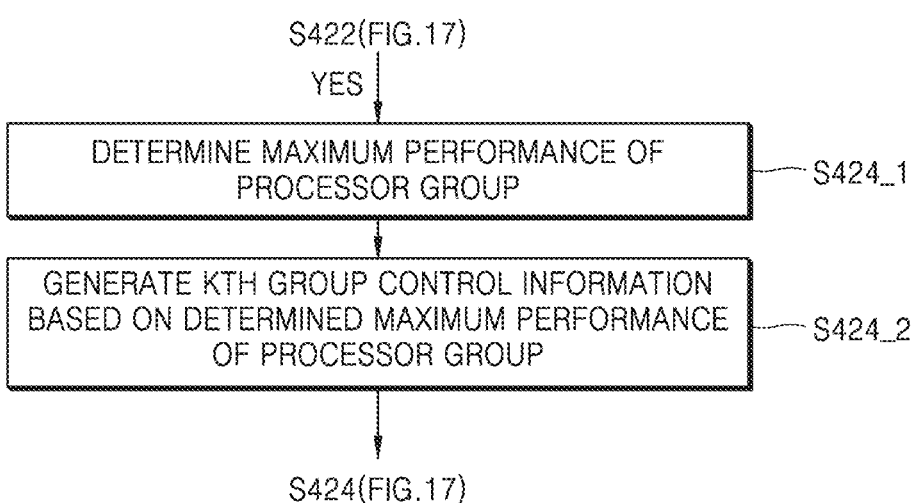
FIG. 19 is a flowchart illustrating a method of operating a performance controller, according to some example embodiments.

FIG. 19 is a flowchart illustrating a method of operating a performance controller, according to some example embodiments.

Referring to FIG. 19, when it is determined in operation S422 that kth history performance information corresponding to a kth function is in the history table, operation S424_1 follows so that the performance controller may determine the maximum performance of the processor group.

In operation S424_2, the performance controller may generate the kth group control information for collectively controlling the processors of the processor group based on the determined maximum performance of the processor group. Then, operation S424 of FIG. 17 may follow.

Figure 20:
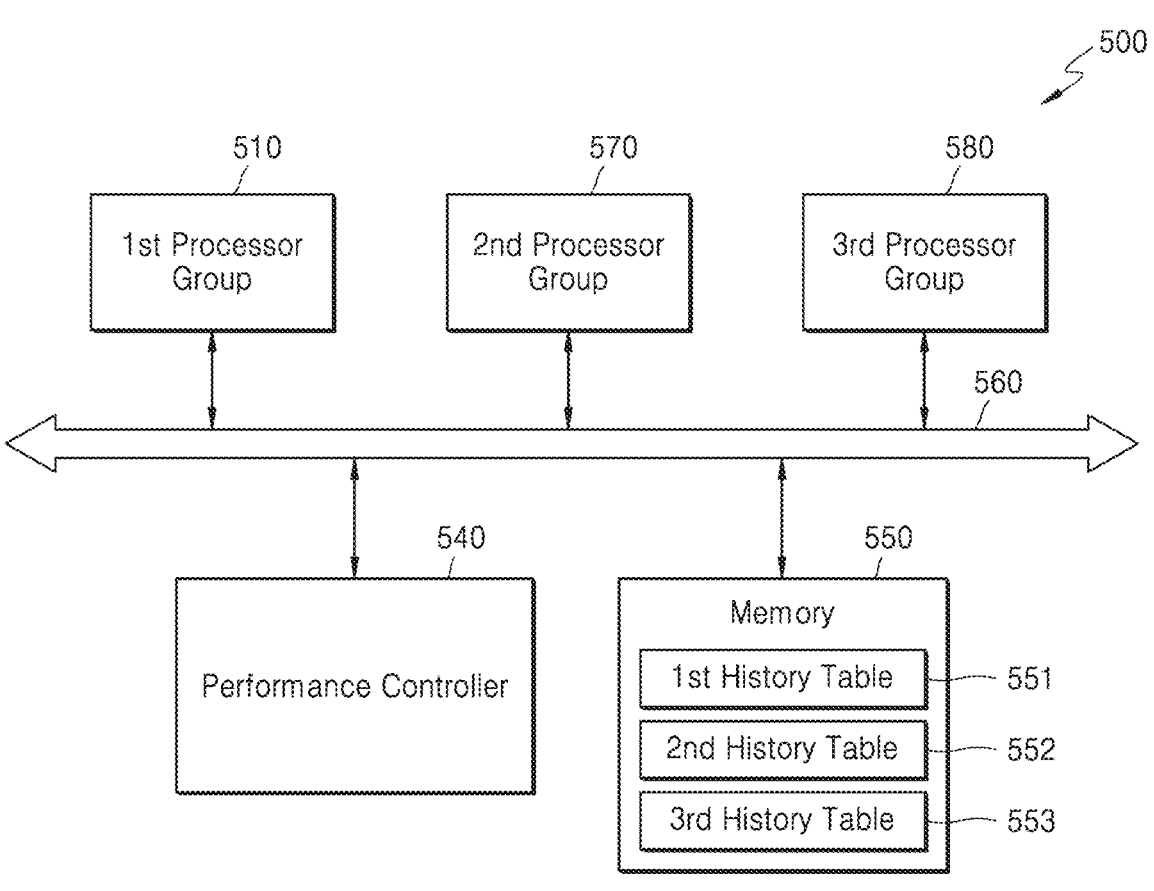
FIG. 20 is a block diagram illustrating an SoC according to some example embodiments.

FIG. 20 is a block diagram illustrating an SoC 500 according to some example embodiments.

Referring to FIG. 20, the SoC 500 may include a first processor group 510, a second processor group 570, a third processor group 580, a performance controller 540, memory 550, and a bus 560.

In some example embodiments, the memory 550 may include first to third history tables 551 to 553. The first history table 551 may be used to control performance of the first processor group 510 in units of functions, the second history table 552 may be used to control performance of the second processor group 570, and the third history table 553 may be used to control performance of the third processor group 580.

In some example embodiments, the first processor group 510 may execute first code corresponding to at least one first application, and the first code may include a plurality of first functions. The first history table 551 may store a plurality of first history performance information items respectively corresponding to the plurality of first functions.

In some example embodiments, the second processor group 570 may execute second code corresponding to at least one second application, and the second code may include a plurality of second functions. The second history table 552 may store a plurality of second history performance information items respectively corresponding to the plurality of second functions.

In some example embodiments, the third processor group 580 may execute third code corresponding to at least one third application, and the third code may include a plurality of third functions. The third history table 553 may store a plurality of third history performance information items respectively corresponding to the plurality of third functions.

In some example embodiments, the performance controller 540 may control the performance of the first processor group 510 for each function executed by the first processor group 510 by using the first history table 551, may control the performance of the second processor group 570 for each function executed by the second processor group 570 by using the second history table 552, and may control the performance of the third processor group 580 for each function executed by the third processor group 580 by using the third history table 553.

In some example embodiments, the maximum performance of the first to third processor groups 510, 570, and 580 may be different. The performance controller 540 may perform performance control operations of the first to third processor groups 510, 570, and 580 for each function by using the first to third history tables 551, 552, and 553 in consideration of the maximum performance of the first to third processor groups 510, 570, and 580.

Figure 21:
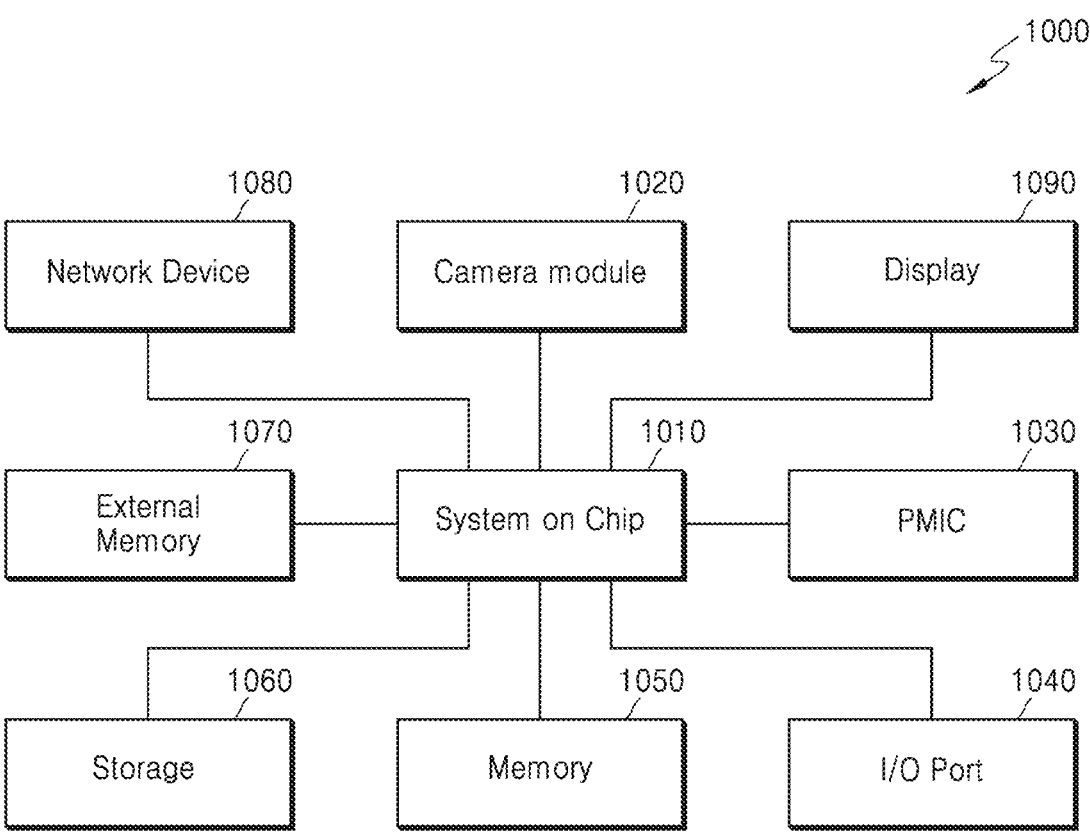
FIG. 21 is a block diagram illustrating an electronic device according to some example embodiments.

FIG. 21 is a block diagram illustrating an electronic device 1000 according to some example embodiments.

Referring to FIG. 21, the electronic device 1000 may include a PC, a data server, and/or a portable electronic device.

The electronic device 1000 may include a SoC 1010, a camera module 1020, a power management integrated circuit (PMIC) 1030, an input/output port 1040, memory 1050, a storage 1060, external memory 1070, a network device 1080, and a display 1090.

The camera module 1020 may convert an optical image into an electrical image. Accordingly, the electrical image output from the camera module 1020 may be stored in the storage 1060, the memory 1050, and/or the external memory 1070.

The display 1090 may display data output from the storage 1060, the memory 1050, the input/output port 1040, the external memory 1070, and/or the network device 1080.

The PMIC 1030 may supply an operating voltage to at least one of the components.

The input/output port 1040 may transmit data to the electronic device 1000 or may transmit data output from the electronic device 1000 to an external device. For example, the input/output port 1040 may be a port for connecting a pointing device such as a computer mouse, a port for connecting a printer, and/or a port for connecting a universal serial bus (USB) drive.

The memory 1050 may include volatile memory or non-volatile memory. In some example embodiments, a memory controller capable of controlling a data access operation for the memory 1050, such as a read operation, a write operation (or a program operation), or an erase operation, may be integrated or embedded in the SoC 1010. In some example embodiments, the memory controller may be implemented between the SoC 1010 and the memory 1050.

The storage 1060 may include a hard disk drive or a solid state drive (SSD).

The external memory 1070 may include a secure digital (SD) card or a multimedia card (MMC). In some example embodiments, the external memory 1070 may be a subscriber identity module (SIM) card or a universal subscriber identity module (USIM) card.

The network device 1080 may connect the electronic device 1000 to a wired network or a wireless network.

The SoC 1010 may perform operations according to some example embodiments described with reference to FIGS. 1 to 20, and may have a structure suitable for some example embodiments.

In the above-described example embodiments, components according to the inventive concepts have been described by using terms such as first, second, and third. However, the terms such as first, second, and third are used to distinguish the components from one another and the inventive concepts are not limited thereto. For example, the terms such as first, second, and third do not imply order or numerical meaning in any form. In the above-described example embodiments, components according to some example embodiments of the inventive concepts have been referred by using blocks. The blocks may include various hardware devices such as an integrated circuit (IC), an application specific IC (ASIC), a field programmable gate array (FPGA), and a complex programmable logic device (CPLD), firmware running on hardware devices, software such as applications, or a combination of hardware devices and software. In addition, the blocks may include circuits including semiconductor devices in an integrated circuit (IC) or circuits registered as intellectual property (IP).

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While the inventive concepts have been particularly shown and described with reference to example embodiments thereof, it will be understood that various changes in form and details may be made therein without departing from the spirit and scope of the following claims.

What is claimed is:

1. A system on chip (SoC) comprising:
a processor configured to execute code corresponding to at least one application; and
a performance controller configured to
recognize functions based on the code and code information, the code information including a point in time at which the processor starts executing a function of the functions and a target address of the function,
generate control information for controlling performance of the processor for each of the functions by using a history table in which a plurality of history performance information items respectively corresponding to the functions are stored, based on the function being greater than a reference size, and
generate a control signal corresponding to the control information.

2. The SoC of claim 1, wherein the performance controller is configured to recognize a point in time at which the processor completes executing the function of the functions based on the code information for the code received from the processor.

3. The SoC of claim 2, wherein the code information comprises times at which function call commands of the functions are generated and times at which return commands of the functions are generated.

4. The SoC of claim 1, wherein the functions are accessed by a global function call command using an indirect branch.

5. The SoC of claim 1, wherein, before executing a kth function, the performance controller is configured to
obtain kth history performance information corresponding to the kth function from the history table,
generate kth control information for executing the kth function based on the obtained kth history performance information, and
generate a kth control signal corresponding to the kth control information.

6. The SoC of claim 5, wherein the performance controller is further configured to generate the kth control information based on a processing type of the kth function.

7. The SoC of claim 5, wherein the performance controller is configured to
compare kth actual performance information generated by measuring performance of the processor executing the kth function based on the kth control signal with kth predicted performance information corresponding to the kth control information, and
update the kth history performance information based on the comparison result.

8. The SoC of claim 1, wherein, before executing a kth function, based on kth history performance information corresponding to the kth function not being in the history table, the performance controller is configured to generate a kth control signal based on a default control method and store information generated by measuring performance of the processor executing the kth function based on the kth control signal in the history table as the kth history performance information.

9. The SoC of claim 8, wherein the performance controller is configured to generate kth history performance information based on an average of a plurality of performance information items generated by measuring performance of the processor a plurality of times in a measurement period in a section in which the processor executes the kth function.

10. The SoC of claim 1, wherein the plurality of history performance information items of the processor comprise at least one of operating frequency information, operating voltage information, throttling information, active clock gating information, utilization information, or temperature information.

11. The SoC of claim 1, further comprising:
a clock management unit (CMU) configured to provide a clock signal to the processor; and
a power management unit (PMU) configured to provide an operating voltage to the processor,
wherein the control signal comprises,
a first sub-control signal provided to the CMU to control a frequency of the clock signal;
a second sub-control signal provided to the PMU to control a magnitude of the operating voltage; and
a third sub-control signal provided to the processor for throttle control or active clock gating control.

12. The SoC of claim 1, wherein the plurality of history performance information items in the history table are mapped to the target addresses of each of the functions and accessed through the target addresses.

13. A system on chip (SoC) comprising:
a first intellectual property (IP) configured to execute first code corresponding to at least one first application;

a second IP configured to execute second code corresponding to at least one second application; and a performance controller configured to recognize first functions based on the first code and first code information, the first code information including a point in time at which the first IP starts executing a first function of the first functions and a target address of the first function, recognize second functions based on the second code and second code information, the second code information including a point in time at which the second IP starts executing a second function of the second functions and a target address of the second function, generate first control information for controlling performance of the first IP for each of the first functions by using a first history table in which a plurality of first history performance information items respectively corresponding to the first functions included in the first code are stored based on the first function being greater than a reference size, and generate second control information for controlling performance of the second IP for each of the second functions by using a second history table in which a plurality of second history performance information items respectively corresponding to the second functions included in the second code are stored based on the second function being greater than the reference size, wherein each of the first and second functions is accessed through a global function call command using an indirect branch.

14. The SoC of claim 13, wherein the performance controller is configured to generate the first control information based on characteristics of the first IP, and generate the second control information based on characteristics of the second IP.

15. A system on chip (SoC) comprising:

a first processor group including a plurality of first processors, each of the plurality of first processors configured to execute first code corresponding to at least one first application; and a performance controller configured to recognize first functions based on the first code and first code information, the first code information including a point in time at which the first processor group starts executing a first function of the first functions and a target address of the first function, generate a plurality of first sub-control information items of the plurality of first processors for each of the first functions by using a history table in which a plurality of first history performance information items respectively corresponding to the first functions included in the first code are stored, based on the first function being greater than a reference size, generate first group control information for collectively controlling the plurality of first processors based on the first sub-control information items, and generate a first group control signal corresponding to the first group control information.

16. The SoC of claim 15, wherein the performance controller is configured to generate the first group control information based on maximum performance of the first processor group.

17. The SoC of claim 15, wherein the plurality of first processors are configured to receive clock signals of a same operating voltage or a same operation frequency.

18. The SoC of claim 15, wherein the performance controller is configured to generate the first sub-control information items in parallel.

19. The SoC of claim 15, wherein the first functions are accessed by an indirect branch target address.

20. The SoC of claim 15, further comprising:

a second processor group including a plurality of second processors each executing second code corresponding to at least one second application, wherein the performance controller is configured to generate a plurality of second sub-control information items of the plurality of second processors for each of second functions by using the history table in which a plurality of second history performance information items respectively corresponding to the second functions included in the second code are stored, generate second group control information for collectively controlling the plurality of second processors based on the second sub-control information items, and generate a second group control signal corresponding to the second group control information.

\* \* \* \* \*